United States Patent
Jordan Peters et al.

(10) Patent No.: US 10,157,422 B2
(45) Date of Patent: Dec. 18, 2018

(54) ROAD SEGMENT SAFETY RATING

(71) Applicant: Allstate Insurance Company, Northbrook, IL (US)

(72) Inventors: Julie A. Jordan Peters, Libertyville, IL (US); Dana Ferguson, Chicago, IL (US); Regina Madigan, Mountain View, CA (US); Thomas McKenna, San Francisco, CA (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 14/607,433

(22) Filed: Jan. 28, 2015

(65) Prior Publication Data

US 2016/0086285 A1    Mar. 24, 2016

Related U.S. Application Data

(63) Continuation-in-part of application No. 14/100,913, filed on Dec. 9, 2013, now Pat. No. 8,996,303, which
(Continued)

(51) Int. Cl.
*G06Q 40/08*    (2012.01)
*G01C 21/00*    (2006.01)
(Continued)

(52) U.S. Cl.
CPC ............ *G06Q 40/08* (2013.01); *G06Q 10/04* (2013.01); *G06Q 10/0635* (2013.01);
(Continued)

(58) Field of Classification Search
None
See application file for complete search history.

(56) References Cited

U.S. PATENT DOCUMENTS 83,960 A    11/1868    Heator
4,119,166 A    10/1978    Ayotte et al.
(Continued)

FOREIGN PATENT DOCUMENTS

CN    101131588 A    2/2008
DE    102010001006 A1    7/2011
(Continued)

OTHER PUBLICATIONS

Quad City Intersection Traffic Accident Study, Davenport-Rock Island-Moline Urbanized Area 1993 data, Bi-State Regional Commission, Mar. 1996; http://ntl.bts.gov/lib/000/300/338/00338.pdf; 78 pages; downloaded Apr. 8, 2008.
(Continued)

*Primary Examiner* — Rami Khatib
(74) *Attorney, Agent, or Firm* — Banner & Witcoff, Ltd.

(57) ABSTRACT

Methods, computer-readable media, systems and apparatuses for determining a road segment safety rating are provided. In some arrangements, the road segment safety rating may be based on historical data associated with the road segment (e.g., accident history data, traffic volume data, etc.). In other examples, the road segment safety rating may be based on historical data as well as driving behavior data of the operator of the vehicle. In some arrangements, the determined road segment safety rating may be compared to a threshold. If the road segment safety rating is below the threshold, the system may generate one or more alternate road segments or route for the driver to consider. In some examples, the road segment safety rating may be used to determine an insurance premium or one or more insurance incentives to provide to the user.

20 Claims, 13 Drawing Sheets

Related U.S. Application Data is a continuation of application No. 12/118,021, filed on May 9, 2008, now Pat. No. 8,606,512.

(60) Provisional application No. 60/917,169, filed on May 10, 2007.

(51) Int. Cl.

| | | |
|---|---|---|
| *G07C 5/00* | (2006.01) | |
| *G06Q 10/06* | (2012.01) | |
| *G06Q 30/02* | (2012.01) | |
| *G08G 1/0968* | (2006.01) | |
| *G06Q 10/04* | (2012.01) | |
| *G08G 1/01* | (2006.01) | |
| *G08G 1/0967* | (2006.01) | |
| *G01C 21/34* | (2006.01) | |

(52) U.S. Cl.
CPC ......... *G06Q 30/0207* (2013.01); *G07C 5/008* (2013.01); *G08G 1/012* (2013.01); *G08G 1/0112* (2013.01); *G08G 1/0129* (2013.01); *G08G 1/0141* (2013.01); *G08G 1/096716* (2013.01); *G08G 1/096741* (2013.01); *G08G 1/096775* (2013.01); *G08G 1/096816* (2013.01); *G08G 1/096827* (2013.01); *G08G 1/096838* (2013.01); *G01C 21/3461* (2013.01)

(56) References Cited

U.S. PATENT DOCUMENTS

| | | | |
|---|---|---|---|
| 4,622,636 A | | 11/1986 | Tachibana |
| 4,926,336 A | | 5/1990 | Yamada |
| 5,053,964 A | | 10/1991 | Mister et al. |
| 5,270,708 A | * | 12/1993 | Kamishima ........ G01C 21/3697 340/905 |
| 5,295,551 A | | 3/1994 | Sukonick |
| 5,430,432 A | | 7/1995 | Camhi et al. |
| 5,465,079 A | | 11/1995 | Bouchard et al. |
| 5,475,387 A | | 12/1995 | Matsumoto |
| 5,572,449 A | | 11/1996 | Tang et al. |
| 5,680,122 A | | 10/1997 | Mio |
| 5,710,565 A | | 1/1998 | Shirai et al. |
| 5,797,134 A | * | 8/1998 | McMillan .......... G06Q 30/0283 705/4 |
| 5,848,373 A | | 12/1998 | DeLorme et al. |
| 6,026,345 A | | 2/2000 | Shah et al. |
| 6,064,970 A | | 5/2000 | McMillan et al. |
| 6,116,369 A | | 9/2000 | King et al. |
| 6,128,559 A | | 10/2000 | Saitou et al. |
| 6,186,793 B1 | | 2/2001 | Brubaker |
| 6,188,950 B1 | | 2/2001 | Tsutsumi et al. |
| 6,301,530 B1 | | 10/2001 | Tamura |
| 6,366,207 B1 | * | 4/2002 | Murphy ............... A61B 5/18 340/540 |
| 6,389,351 B1 | | 5/2002 | Egawa et al. |
| 6,415,226 B1 | * | 7/2002 | Kozak ............... G01C 21/3461 340/988 |
| 6,502,020 B2 | | 12/2002 | Lang |
| 6,502,035 B2 | | 12/2002 | Levine |
| 6,647,328 B2 | | 11/2003 | Walker |
| 6,675,094 B2 | | 1/2004 | Russell et al. |
| 6,707,378 B2 | | 3/2004 | MacNeille et al. |
| 6,732,024 B2 | | 5/2004 | Wilhelm Rekow et al. |
| 6,780,077 B2 | | 8/2004 | Baumgartner et al. |
| 6,868,386 B1 | | 3/2005 | Henderson et al. |
| 6,931,309 B2 | * | 8/2005 | Phelan ................ G01M 17/00 340/439 |
| 6,982,635 B2 | | 1/2006 | Obradovich |
| 7,116,248 B2 | | 10/2006 | Lu et al. |
| 7,133,771 B1 | | 11/2006 | Nesbitt |
| 7,186,199 B1 | | 3/2007 | Baxter, Jr. |
| 7,286,825 B2 | | 10/2007 | Shishido et al. |
| 7,304,589 B2 | | 12/2007 | Kagawa |
| 7,315,239 B2 | | 1/2008 | Cheng et al. |
| 7,339,483 B1 | | 3/2008 | Farmer |
| 7,353,111 B2 | | 4/2008 | Takahashi et al. |
| 7,356,516 B2 | | 4/2008 | Richey et al. |
| 7,366,892 B2 | | 4/2008 | Spaur et al. |
| 7,546,206 B1 | * | 6/2009 | Miller ................ G01C 21/00 701/120 |
| 7,610,210 B2 | | 10/2009 | Helitzer et al. |
| 7,650,211 B2 | | 1/2010 | Wang et al. |
| 7,657,370 B2 | * | 2/2010 | Nagase ............. G01C 21/3492 340/995.13 |
| 7,657,441 B2 | | 2/2010 | Richey et al. |
| 7,660,725 B2 | | 2/2010 | Wahlbin et al. |
| 7,664,589 B2 | | 2/2010 | Etori et al. |
| 7,739,087 B2 | | 6/2010 | Qiu |
| 7,805,321 B2 | | 9/2010 | Wahlbin et al. |
| 7,821,421 B2 | | 10/2010 | Tamir et al. |
| 7,937,278 B1 | | 5/2011 | Cripe et al. |
| 7,966,118 B2 | | 6/2011 | Kade |
| 7,991,629 B2 | | 8/2011 | Gay et al. |
| 8,031,062 B2 | | 10/2011 | Smith |
| 8,065,169 B1 | | 11/2011 | Oldham et al. |
| 8,078,349 B1 | | 12/2011 | Prada Gomez et al. |
| 8,078,382 B2 | | 12/2011 | Sugano et al. |
| 8,086,523 B1 | | 12/2011 | Palmer |
| 8,090,598 B2 | | 1/2012 | Bauer et al. |
| 8,139,109 B2 | | 3/2012 | Schmiedel et al. |
| 8,145,393 B2 | | 3/2012 | Foster et al. |
| 8,152,589 B2 | | 4/2012 | Bowen et al. |
| 8,160,809 B2 | | 4/2012 | Farwell et al. |
| 8,180,655 B1 | | 5/2012 | Hopkins, III |
| 8,195,394 B1 | | 6/2012 | Zhu et al. |
| 8,229,618 B2 | | 7/2012 | Tolstedt et al. |
| 8,280,308 B2 | | 10/2012 | Anschutz et al. |
| 8,280,752 B1 | | 10/2012 | Cripe et al. |
| 8,290,701 B2 | | 10/2012 | Mason et al. |
| 8,314,718 B2 | | 11/2012 | Muthaiah et al. |
| 8,326,473 B2 | | 12/2012 | Simpson et al. |
| 8,335,607 B2 | | 12/2012 | Gatten et al. |
| 8,352,112 B2 | | 1/2013 | Mudalige |
| 8,407,139 B1 | | 3/2013 | Palmer |
| 8,457,827 B1 | | 6/2013 | Ferguson et al. |
| 8,457,892 B2 | | 6/2013 | Aso et al. |
| 8,538,785 B2 | | 9/2013 | Coleman et al. |
| 8,566,126 B1 | | 10/2013 | Hopkins, III |
| 8,577,703 B2 | | 11/2013 | McClellan et al. |
| 8,595,037 B1 | | 11/2013 | Hyde et al. |
| 8,606,512 B1 | * | 12/2013 | Bogovich ............. G06Q 40/08 340/995.28 |
| 8,620,693 B1 | | 12/2013 | Schumann, Jr. |
| 8,639,535 B1 | | 1/2014 | Kazenas |
| 8,686,844 B1 | | 4/2014 | Wine |
| 8,718,861 B1 | | 5/2014 | Montemerlo et al. |
| 8,750,306 B2 | | 6/2014 | Yousefi et al. |
| 8,757,309 B2 | | 6/2014 | Schmitt et al. |
| 8,781,669 B1 | | 7/2014 | Teller et al. |
| 8,798,841 B1 | | 8/2014 | Nickolaou et al. |
| 8,799,036 B2 | | 8/2014 | Christensen et al. |
| 8,812,330 B1 | | 8/2014 | Cripe et al. |
| 8,949,016 B1 | | 2/2015 | Ferguson et al. |
| 8,954,226 B1 | | 2/2015 | Binion et al. |
| 8,996,303 B1 | | 3/2015 | Bogovich et al. |
| 9,020,751 B1 | | 4/2015 | Bogovich et al. |
| 9,046,374 B2 | | 6/2015 | Ricci |
| 9,063,543 B2 | | 6/2015 | An et al. |
| 9,079,587 B1 | | 7/2015 | Rupp et al. |
| 9,141,582 B1 | | 9/2015 | Brinkmann et al. |
| 9,188,985 B1 | | 11/2015 | Hobbs et al. |
| 9,216,737 B1 | | 12/2015 | Zhu et al. |
| 9,262,787 B2 | | 2/2016 | Binion et al. |
| 9,330,571 B2 | | 5/2016 | Ferguson et al. |
| 9,355,423 B1 | | 5/2016 | Slusar |
| 9,384,148 B2 | | 7/2016 | Muttik et al. |
| 9,495,874 B1 | | 11/2016 | Zhu et al. |
| 9,792,656 B1 | | 10/2017 | Konrardy et al. |
| 9,851,214 B1 | | 12/2017 | Chintakindi |
| 2001/0020902 A1 | * | 9/2001 | Tamura ............. G01C 21/3697 340/905 |
| 2001/0039509 A1 | | 11/2001 | Dar et al. |

(56) References Cited

U.S. PATENT DOCUMENTS

| | | |
|---|---|---|
| 2002/0022920 A1 | 2/2002 | Straub |
| 2002/0024464 A1 | 2/2002 | Kovell et al. |
| 2002/0095249 A1 | 7/2002 | Lang |
| 2002/0111725 A1 | 8/2002 | Burge |
| 2002/0111738 A1 | 8/2002 | Iwami et al. |
| 2002/0120396 A1* | 8/2002 | Boies .................. G06Q 10/047 701/424 |
| 2002/0178033 A1 | 11/2002 | Yoshioka et al. |
| 2003/0128107 A1 | 7/2003 | Wilkerson |
| 2003/0182165 A1 | 9/2003 | Kato et al. |
| 2003/0187704 A1 | 10/2003 | Hashiguchi et al. |
| 2004/0021583 A1 | 2/2004 | Lau et al. |
| 2004/0054452 A1* | 3/2004 | Bjorkman ................ A61B 5/18 701/31.4 |
| 2004/0068555 A1 | 4/2004 | Satou |
| 2004/0098464 A1 | 5/2004 | Koch et al. |
| 2004/0103006 A1 | 5/2004 | Wahlbin et al. |
| 2004/0103010 A1 | 5/2004 | Wahlbin et al. |
| 2004/0128613 A1 | 7/2004 | Sinisi |
| 2004/0142678 A1 | 7/2004 | Krasner |
| 2004/0153362 A1 | 8/2004 | Bauer et al. |
| 2004/0236476 A1 | 11/2004 | Chowdhary |
| 2004/0254698 A1 | 12/2004 | Hubbard et al. |
| 2004/0260579 A1* | 12/2004 | Tremiti .................. G06Q 40/08 705/4 |
| 2005/0091175 A9 | 4/2005 | Farmer |
| 2005/0107951 A1* | 5/2005 | Brulle-Drews .... G01C 21/3461 701/533 |
| 2005/0137757 A1* | 6/2005 | Phelan .................. G01M 17/00 701/1 |
| 2005/0174217 A1 | 8/2005 | Basir et al. |
| 2005/0228622 A1 | 10/2005 | Jacobi |
| 2005/0256638 A1* | 11/2005 | Takahashi .......... G01C 21/3484 701/431 |
| 2005/0264404 A1 | 12/2005 | Franczyk et al. |
| 2005/0283503 A1 | 12/2005 | Hancock et al. |
| 2005/0288046 A1 | 12/2005 | Zhao et al. |
| 2006/0006990 A1 | 1/2006 | Obradovich |
| 2006/0053038 A1 | 3/2006 | Warren et al. |
| 2006/0055565 A1* | 3/2006 | Kawamata ........... G08G 1/0962 340/995.13 |
| 2006/0095301 A1 | 5/2006 | Gay |
| 2006/0129313 A1* | 6/2006 | Becker .............. G01C 21/3484 701/533 |
| 2006/0129445 A1 | 6/2006 | McCallum |
| 2006/0161341 A1 | 7/2006 | Haegebarth et al. |
| 2006/0206623 A1 | 9/2006 | Gipps et al. |
| 2006/0221328 A1 | 10/2006 | Rouly |
| 2006/0247852 A1 | 11/2006 | Kortge et al. |
| 2006/0253307 A1 | 11/2006 | Warren et al. |
| 2007/0021910 A1 | 1/2007 | Iwami et al. |
| 2007/0027583 A1 | 2/2007 | Tamir et al. |
| 2007/0136107 A1 | 6/2007 | Maguire et al. |
| 2007/0167147 A1 | 7/2007 | Krasner et al. |
| 2007/0182532 A1* | 8/2007 | Lengning ............. G10H 1/0041 340/439 |
| 2007/0216521 A1* | 9/2007 | Guensler ............. G08G 1/0104 340/439 |
| 2007/0256499 A1 | 11/2007 | Pelecanos et al. |
| 2007/0257815 A1* | 11/2007 | Gunderson ............. G08G 1/16 340/903 |
| 2007/0282638 A1 | 12/2007 | Surovy |
| 2008/0004802 A1* | 1/2008 | Horvitz .............. G01C 21/3415 701/533 |
| 2008/0013789 A1 | 1/2008 | Shima et al. |
| 2008/0033637 A1* | 2/2008 | Kuhlman ................ H04L 63/10 701/533 |
| 2008/0059007 A1 | 3/2008 | Whittaker et al. |
| 2008/0059351 A1 | 3/2008 | Richey et al. |
| 2008/0091309 A1 | 4/2008 | Walker |
| 2008/0091490 A1 | 4/2008 | Abrahams et al. |
| 2008/0114542 A1* | 5/2008 | Nambata .......... G08G 1/096827 701/533 |
| 2008/0148409 A1 | 6/2008 | Ampunan et al. |
| 2008/0161987 A1 | 7/2008 | Breed |
| 2008/0243558 A1 | 10/2008 | Gupte |
| 2008/0258890 A1 | 10/2008 | Follmer et al. |
| 2008/0319602 A1 | 12/2008 | McClellan et al. |
| 2009/0024419 A1 | 1/2009 | McClellan et al. |
| 2009/0063201 A1 | 3/2009 | Nowotarski et al. |
| 2009/0079839 A1 | 3/2009 | Fischer et al. |
| 2009/0115638 A1* | 5/2009 | Shankwitz ............. G01C 21/26 340/988 |
| 2009/0140887 A1 | 6/2009 | Breed et al. |
| 2009/0312945 A1 | 12/2009 | Sakamoto et al. |
| 2010/0023183 A1 | 1/2010 | Huang et al. |
| 2010/0030586 A1 | 2/2010 | Taylor et al. |
| 2010/0131300 A1 | 5/2010 | Collopy et al. |
| 2010/0131304 A1 | 5/2010 | Collopy et al. |
| 2010/0131307 A1 | 5/2010 | Collopy et al. |
| 2010/0138244 A1 | 6/2010 | Basir |
| 2010/0211270 A1 | 8/2010 | Chin et al. |
| 2010/0250087 A1 | 9/2010 | Sauter |
| 2010/0256852 A1 | 10/2010 | Mudalige |
| 2010/0280751 A1 | 11/2010 | Breed |
| 2010/0302371 A1 | 12/2010 | Abrams |
| 2010/0324775 A1 | 12/2010 | Kermani et al. |
| 2010/0332131 A1 | 12/2010 | Horvitz et al. |
| 2011/0029170 A1 | 2/2011 | Hyde et al. |
| 2011/0071718 A1 | 3/2011 | Norris et al. |
| 2011/0077028 A1 | 3/2011 | Wilkes, III et al. |
| 2011/0161119 A1 | 6/2011 | Collins |
| 2011/0173015 A1 | 7/2011 | Chapman et al. |
| 2011/0202305 A1 | 8/2011 | Willis et al. |
| 2011/0210867 A1 | 9/2011 | Benedikt |
| 2012/0034876 A1 | 2/2012 | Nakamura et al. |
| 2012/0053808 A1 | 3/2012 | Arai et al. |
| 2012/0072243 A1 | 3/2012 | Collins et al. |
| 2012/0083960 A1 | 4/2012 | Zhu et al. |
| 2012/0101660 A1 | 4/2012 | Hattori |
| 2012/0109418 A1 | 5/2012 | Lorber |
| 2012/0123641 A1 | 5/2012 | Ferrin et al. |
| 2012/0123806 A1 | 5/2012 | Schumann, Jr. et al. |
| 2012/0173290 A1 | 7/2012 | Collins et al. |
| 2012/0197669 A1 | 8/2012 | Kote et al. |
| 2012/0209505 A1 | 8/2012 | Breed et al. |
| 2012/0290146 A1 | 11/2012 | Dedes et al. |
| 2012/0295592 A1 | 11/2012 | Peirce |
| 2013/0006469 A1 | 1/2013 | Green et al. |
| 2013/0006674 A1 | 1/2013 | Bowne et al. |
| 2013/0006675 A1 | 1/2013 | Bowne et al. |
| 2013/0013179 A1 | 1/2013 | Lection et al. |
| 2013/0030606 A1 | 1/2013 | Mudalige et al. |
| 2013/0037650 A1 | 2/2013 | Heppe |
| 2013/0046559 A1 | 2/2013 | Coleman et al. |
| 2013/0052614 A1 | 2/2013 | Mollicone et al. |
| 2013/0066511 A1 | 3/2013 | Switkes et al. |
| 2013/0073321 A1 | 3/2013 | Hofmann et al. |
| 2013/0090821 A1 | 4/2013 | Abboud et al. |
| 2013/0131906 A1 | 5/2013 | Green et al. |
| 2013/0144657 A1 | 6/2013 | Ricci |
| 2013/0147638 A1 | 6/2013 | Ricci |
| 2013/0166325 A1 | 6/2013 | Ganapathy et al. |
| 2013/0179198 A1 | 7/2013 | Bowne et al. |
| 2013/0198737 A1 | 8/2013 | Ricci |
| 2013/0198802 A1 | 8/2013 | Ricci |
| 2013/0200991 A1 | 8/2013 | Ricci et al. |
| 2013/0203400 A1 | 8/2013 | Ricci |
| 2013/0204645 A1 | 8/2013 | Lehman et al. |
| 2013/0212659 A1 | 8/2013 | Maher et al. |
| 2013/0218603 A1 | 8/2013 | Hagelstein et al. |
| 2013/0218604 A1 | 8/2013 | Hagelstein et al. |
| 2013/0226441 A1* | 8/2013 | Horita ...................... B60Q 9/00 701/118 |
| 2013/0250933 A1 | 9/2013 | Yousefi et al. |
| 2013/0253809 A1* | 9/2013 | Jones .................. G08G 1/0112 701/117 |
| 2013/0261944 A1 | 10/2013 | Koshizen |
| 2013/0304513 A1 | 11/2013 | Hyde et al. |
| 2013/0304514 A1 | 11/2013 | Hyde et al. |
| 2013/0311002 A1 | 11/2013 | Isaac |
| 2014/0074512 A1 | 3/2014 | Hare et al. |
| 2014/0080098 A1 | 3/2014 | Price |

(56) References Cited

U.S. PATENT DOCUMENTS

| | | |
|---|---|---|
| 2014/0088855 A1 | 3/2014 | Ferguson |
| 2014/0108058 A1 | 4/2014 | Bourne et al. |
| 2014/0113619 A1 | 4/2014 | Tibbitts et al. |
| 2014/0139341 A1 | 5/2014 | Green et al. |
| 2014/0156133 A1 | 6/2014 | Cullinane et al. |
| 2014/0156134 A1 | 6/2014 | Cullinane et al. |
| 2014/0172221 A1 | 6/2014 | Solyom et al. |
| 2014/0180723 A1 | 6/2014 | Cote et al. |
| 2014/0210644 A1 | 7/2014 | Breed |
| 2014/0257871 A1 | 9/2014 | Christensen et al. |
| 2014/0257873 A1 | 9/2014 | Hayward et al. |
| 2014/0266795 A1 | 9/2014 | Tseng et al. |
| 2014/0272810 A1 | 9/2014 | Fields et al. |
| 2014/0300494 A1 | 10/2014 | Tseng et al. |
| 2014/0303827 A1 | 10/2014 | Dolgov et al. |
| 2014/0333468 A1 | 11/2014 | Zhu et al. |
| 2014/0350970 A1 | 11/2014 | Schumann, Jr. et al. |
| 2014/0358413 A1 | 12/2014 | Trombley et al. |
| 2014/0379384 A1 | 12/2014 | Duncan et al. |
| 2014/0379385 A1 | 12/2014 | Duncan et al. |
| 2014/0380264 A1 | 12/2014 | Misra et al. |
| 2015/0025917 A1 | 1/2015 | Stempora |
| 2015/0081404 A1 | 3/2015 | Basir |
| 2015/0088334 A1 | 3/2015 | Bowers et al. |
| 2015/0088550 A1 | 3/2015 | Bowers et al. |
| 2015/0112543 A1 | 4/2015 | Binion et al. |
| 2015/0112730 A1 | 4/2015 | Binion et al. |
| 2015/0112731 A1 | 4/2015 | Binion et al. |
| 2015/0112733 A1 | 4/2015 | Baker et al. |
| 2015/0134181 A1 | 5/2015 | Ollis |
| 2015/0142244 A1 | 5/2015 | You et al. |
| 2015/0149017 A1 | 5/2015 | Attard et al. |
| 2015/0149019 A1 | 5/2015 | Pilutti et al. |
| 2015/0158486 A1 | 6/2015 | Healey et al. |
| 2015/0166059 A1 | 6/2015 | Ko |
| 2015/0166062 A1 | 6/2015 | Johnson et al. |
| 2015/0166069 A1 | 6/2015 | Engelman et al. |
| 2015/0170287 A1 | 6/2015 | Tirone et al. |
| 2015/0175168 A1 | 6/2015 | Hoye et al. |
| 2015/0179062 A1 | 6/2015 | Ralston et al. |
| 2015/0187013 A1 | 7/2015 | Adams et al. |
| 2015/0187014 A1 | 7/2015 | Adams et al. |
| 2015/0187015 A1 | 7/2015 | Adams et al. |
| 2015/0187019 A1 | 7/2015 | Fernandes et al. |
| 2015/0194055 A1 | 7/2015 | Maass |
| 2015/0217763 A1 | 8/2015 | Reichel et al. |
| 2015/0242953 A1 | 8/2015 | Suiter |
| 2015/0248131 A1 | 9/2015 | Fairfield et al. |
| 2015/0266455 A1 | 9/2015 | Wilson |
| 2016/0009291 A1 | 1/2016 | Pallett et al. |
| 2016/0036558 A1 | 2/2016 | Ibrahim et al. |
| 2016/0086285 A1 | 3/2016 | Jordan Peters et al. |
| 2016/0189303 A1 | 6/2016 | Fuchs |

FOREIGN PATENT DOCUMENTS

| | | |
|---|---|---|
| EP | 1296305 A1 | 3/2003 |
| EP | 2293255 A1 | 3/2011 |
| EP | 2471694 A2 | 7/2012 |
| WO | 2001039090 A1 | 5/2001 |
| WO | 2005108928 A1 | 11/2005 |
| WO | 2008067872 A1 | 6/2008 |
| WO | 2008096376 A1 | 8/2008 |
| WO | 2012014042 A2 | 2/2012 |
| WO | 2012150591 A2 | 11/2012 |
| WO | 2013012926 A1 | 1/2013 |
| WO | 2013126582 A1 | 8/2013 |
| WO | 2013160908 A2 | 10/2013 |
| WO | 2014148975 A1 | 9/2014 |

OTHER PUBLICATIONS

Geographic Information Systems Using CODES Linked Data (Crash Outcome Data Evaluation System), U.S. Department of Transportation National Highway Traffic Safety Administration, Apr. 2001; http://ntl.bts.gov/lib/11000/11100/11149/809-201.pdf; 44 pages; downloaded Apr. 8, 2008.

Final Report: What Value May Geographic Information Systems Add to the Art of Identifying Crash Countermeasures? John S. Miller, Senior Research Scientist, Virginia Transportation Research Council, Charlottesville, Virginia, Apr. 1999; http://www.virginiadot.org/vtrc/main/online_reports/pdf/99413.pdf; 44 pages; downloaded Apr. 8, 2008.

Mapping the Streets of the World, Hilmar Schmundt, Speigel Online, May 12, 2006 03:37 PM, High Technology; http://www.spiegel.de/international/spiegel/0,1518,druck-415848,00.html; 2 pages; downloaded Jun. 25, 2008.

Patents: At the forefront of technological innovation, Printed from the Teleatlas.com website, 2007; http://www.teleatlas.com/WhyTeleAtlas/Innovation/Patents/index.htm; 1 page; downloaded Jun. 25, 2008.

Digital Collection—Metadata View; Quad City Intersection Traffic Accident Study: 1993 Data; http://ntlsearch.bts.gov/tris/record/ntl/338.html; 2 pages; downloaded Jun. 25, 2008.

Advanced Tracking Technologies, Inc., Shadow Tracker Prov5 Track Detail Map, http://www.advantrack.com/map_pro_3.htm; 1 page; downloaded Jun. 25, 2008.

Advanced Tracking Technologies, Inc.; Track Playback; http://www.advantrack.com/Animated-Track-Playback.htm; 1 page; downloaded Jun. 25, 2008.

What is Geocoding?, http://www.trpc.org/programs/gis/geocode.htm; 5 pages; downloaded Jun. 25, 2008.

Logistics, Not Consumers, Best Early Market for Premium Traffic Information, Sep. 25, 2006; http://auto.ihs.com/news/2006/abi-premium-traffic.htm; 2 pages; downloaded Jun. 25, 2008.

Property/Casualty Insurance Gaining Position With Technology; Telematics, the use of Wireless communications and Global Positioning System (GPS) tracking, may soon change the way automobile insurance, both personal and commercial, is priced. Individual rating of a driver, to supplement class rating, now appears to be feasible.; http;//www.towersperrin.com/TILLINGHAST/publications/publications/emphasis/Emphasis_2005_3/Holderedge.pdf; 4 pages; downloaded Apr. 8, 2008.

IVOX's Driver Score; Personal Lines; Benefits to using IVOX DriverScore; http://www.ivosdata.com/personal_lines.html; 1 page; downloaded Jul. 25, 2008.

Group1 Software; Point-Level Geocoding Option Geocoding Enrichment Solution; http://www.g1.com/PDF/Product/PointLevelGeocode.pdf; 2 pages; downloaded Apr. 8, 2008.

Integrated Enterprise Geo-Spatial Technology—Insurance Risk Examples by Brady Foust, Ph.D., Howard Botts, Ph.D. and Margaret Miller, Ph.D., Jan. 27,20076; http://www.directionsmag.com/printer.php?artcicle_id-2081; 2 pages; downloaded Jun. 25, 2008.

How the Discounts Work; www.SaveAsYouDrive.com; http://www.saveasyouddrive.com/page.asp?pageid=34&print=true; 2 pages; downloaded Jun. 25, 2008.

Wardzinski, Dynamic risk assessment in autonomous vehicles motion planning, IEEE, 1st International Conference on Information Technology, Gdansk, May 18-21, 2008 [retrieved on Jul. 25, 2016], Retrieved from the Internet, <URL:http:/kio.pg.gda.pl/lag/download/2008-IEEE%20ICIS-Dynamic%20Risk%20Assessment.pdf>, 4 pages.

Jan. 13, 2016—U.S. Non-Final Office Action—U.S. Appl. No. 14/458,744.

Aug. 15, 2017—U.S. Final Office Action—U.S. Appl. No. 14/458,744.

Aug. 22, 2017—U.S. Non-Final Office Action—U.S. Appl. No. 14/673,150.

Aug. 30, 2017—U.S. Notice of Allowance—U.S. Appl. No. 14/862,266.

Sep. 7, 2017—U.S. Non-Final Office Action—U.S. Appl. No. 14/458,764.

Feb. 10, 2017—U.S. Final Office Action—U.S. Appl. No. 14/733,576.

Mar. 27, 2017—U.S. Non-Final Office Action—U.S. Appl. No. 15/015,623.

Apr. 5, 2017—U.S. Final Office Action—U.S. Appl. No. 14/184,272.

Apr. 6, 2017—U.S. Non-Final Office Action—U.S. Appl. No. 14/697,153.

(56) References Cited

OTHER PUBLICATIONS

Apr. 6, 2017—U.S. Non-Final Office Action—U.S. Appl. No. 14/816,336.
Apr. 7, 2016—U.S. Non-Final Office Action—U.S. Appl. No. 14/816,299.
Apr. 21, 2017—U.S. Non-Final Office Action—U.S. Appl. No. 14/862,266.
Apr. 21, 2017—U.S. Non-Final Office Action—U.S. Appl. No. 15/206,521.
May 19, 2017—U.S. Notice of Allowance—U.S. Appl. No. 14/163,719.
Jun. 1, 2017—U.S. Final Office Action—U.S. Appl. No. 14/458,796.
Apr. 28, 2017—(WO) International Search Report—PCT/US17/16176.
Jun. 6, 2017—U.S. Final Office Action—U.S. Appl. No. 14/697,141.
Jun. 13, 2017—U.S. Final Office Action—U.S. Appl. No. 14/458,764.
Jun. 16, 2017—U.S. Final Office Action—U.S. Appl. No. 14/697,131.
Jul. 13, 2017—U.S. Non-Final Office Action—U.S. Appl. No. 14/733,576.
Jul. 27, 2017—U.S. Final Office Action—U.S. Appl. No. 14/458,826.
Aug. 8, 2017—U.S. Final Office Action—U.S. Appl. No. 15/015,623.
Jan. 8, 2018—U.S. Non-Final Office Action—U.S. Appl. No. 15/015,623.
Aug. 31, 2016—(WO)—International Search Report—App PCT/US2016/036136.
Sep. 9, 2016—U.S. Notice of Allowance—U.S. Appl. No. 14/163,719.
Sep. 9, 2016—U.S. Non-Final Office Action—U.S. Appl. No. 14/697,131.
Sep. 9, 2016—U.S. Non-Final Office Action—U.S. Appl. No. 14/697,141.
Sep. 9, 2016—U.S. Non-Final Office Action—U.S. Appl. No. 14/697,153.
Oct. 6, 2016—U.S. Non-Final Office Action—U.S. Appl. No. 14/184,272.
Oct. 3, 2016—U.S. Non-Final Office Action—U.S. Appl. No. 14/733,576.
Oct. 20, 2016—U.S. Non-Final Office Action—U.S. Appl. No. 14/816,336.
Oct. 21, 2016—U.S. Non-Final Office Action—U.S. Appl. No. 14/862,266.
Oct. 24, 2016—U.S. Non-Final Office Action—U.S. Appl. No. 14/816,299.
Oct. 17, 2016—U.S. Office Action—U.S. Appl. No. 13/892,598.
Nov. 29, 2016—U.S. Non-Final Office—U.S. Appl. No. 14/458,796.
Dec. 12, 2016—U.S. Notice of Allowance—U.S. Appl. No. 14/832,197.
Dec. 19, 2016—U.S. Final Office Action—U.S. Appl. No. 14/607,433.
Dec. 29, 2016—U.S. Non-Final Office Action—U.S. Appl. No. 14/458,764.
Jan. 4, 2017—U.S. Non-Final Office Action—U.S. Appl. No. 14/697,131.
Jan. 4, 2017—U.S. Non-Final Office Action—U.S. Appl. No. 14/697,141.
Jan. 12, 2017—U.S. Non-Final Office Action—U.S. Appl. No. 14/458,826.
Jan. 13, 2017—U.S. Non-Final Office Action—U.S. Appl. No. 14/458,744.
Jan. 19, 2017—U.S. Final Office Action—U.S. Appl. No. 14/673,150.
Sep. 21, 2017—U.S. Final Office Action—U.S. Appl. No. 14/816,299.
Oct. 3, 2017—U.S. Non-Final Office Action—U.S. Appl. No. 14/458,796.
U.S. Appl. No. 61/391,271, Oct. 8, 2010, Appendix to the Specification, "Appendix B", (incorporated by reference in US 20120083960 (Zhu, J. et al)) (Year: 2010).
U.S. Appl. No. 61/391,271, Oct. 8, 2010, Specification, "Google 3.8-292" (incorporated by reference in US 2012-0083960 (Zhu, J. et al)) (Year: 2010).
Oct. 6, 2017—U.S. Final Office Action—U.S. Appl. No. 14/697,153.
Oct. 26, 2017—U.S. Notice of Allowance—U.S. Appl. No. 15/206,521.
Nov. 30, 2017—U.S. Non-Final Office Action—U.S. Appl. No. 14/697,141.
Dec. 5, 2017—U.S. Final Office Action—U.S. Appl. No. 14/816,336.
Dec. 20, 2017—U.S. Notice of Allowance—U.S. Appl. No. 14/184,272.
Dec. 22, 2017—U.S. Notice of Allowance—U.S. Appl. No. 14/733,576.
Dec. 26, 2017—U.S. Notice of Allowance—U.S. Appl. No. 14/163,719.
Dec. 27, 2017—U.S. Non-Final Office Action—U.S. Appl. No. 14/697,131.
Feb. 7, 2018—U.S. Non-Final Office Action—U.S. Appl. No. 15/166,638.
Feb. 12, 2018—U.S. Notice of Allowance—U.S. Appl. No. 14/673,150.
Mar. 9, 2018—U.S. Non-Final Office Action—U.S. Appl. No. 15/013,523.
Mar. 13, 2018—U.S. Notice of Allowance—U.S. Appl. No. 15/206,521.
Mar. 29, 2018—U.S. Notice of Allowance—U.S. Appl. No. 14/697,141.
Apr. 2, 2018—U.S. Notice of Allowance—U.S. Appl. No. 14/697,153.
Mar. 30, 2018—U.S. Notice of Allowance—U.S. Appl. No. 14/816,299.
Apr. 2, 2018—U.S. Non-Final Office Action—U.S. Appl. No. 14/816,336.
May 14, 2018 U.S. Non-Final Office Action—U.S. Appl. No. 14/458,826.
May 15, 2018 U.S. Notice of Allowance—U.S. Appl. No. 14/163,719.
May 17, 2018 U.S. Notice of Allowance—U.S. Appl. No. 14/697,131.
May 18, 2018 U.S. Non-Final Office Action—U.S. Appl. No. 14/458,744.
Jun. 6, 2018—U.S. Notice of Allowance—U.S. Appl. No. 15/015,623.
Jun. 14, 2018—U.S. Final Office Action—U.S. Appl. No. 14/458,796.
Jun. 5, 2018—(CA) Office Action—App 2,975,087.
Kirkpatrick, Keith, "Legal issues with Robots," Communications of the ACM, Nov. 2013, vol. 56 No. 11, pp. 17-19.
Ingolfo, Silvia, and Silva Souza, Vitor E., "Law and Adaptivity in Requirements Engineering," SEAMS 2013, pp. 163-168.
O'Donnell, Anthony, "Prepare for Deep Auto Insurance Premium Drop Scenario, Celent Report Advises," Insurance & Technology, May 8, 2012, downloaded from http://www.insurancetech.com/claims/prepare-for-deep-auto-insurance-premium/232901645?printer_friendly=this-page, Jan. 9, 2014, 3 pages.
Top issues: An annual report "The insurance industry in 2013; Strategy: Reshaping auto insurance", vol. 5, 2013, 6 pages.
O'Donnell, Anthony, "Rapid Emergence of Driverless Cars Demands Creation of Legal Infrastructure, Stanford Scholar Says," Insurance & Technology—Online, Jan. 3, 2013, downloaded from http: I I search.proquest.com .ezproxy.apollolibrary.com/ docview / 12 66 314 720 /fulltext/ 142 DA8916CC2 E861A14/ 11 ?accountid = 3 5812, Jan. 8, 2014, 2 pages.
"Self-driving cars: The next revolution" (kpmg.com | cargroup.org), 2012, 36 pages.
The autonomous car: The road to driverless driving, May 30, 2013, downloaded from analysis.telematicsupdate.com/v2x-safety/autonomous-car-road-driverless-driving on Jan. 2, 2014, 6 pages.
Ruquet, Mark E., "Who Insures a Driverless Car"? Property & Casualty 360, Oct. 1, 2012, downloaded from http:// search.proquest.com on Jan. 8, 2014, 2 pages.
Neil, Dan, "Who's Behind the Wheel? Nobody. The driverless car is coming. And we all should be glad it is," Wall Street Journal (Online) [New York, N.Y] Sep. 24, 2012, downloaded from http://search.proquest.com on Jan. 8, 2014, 4 pages.
Sylund, Anders, "Would You Buy a Self-Driving Car to Save 80% on Auto Insurance?" The Motley Fool, Nov. 27, 2013, http://www.dailyfinance.com/2013/11/27/would-you-buy-a-self-driving-car-to-save-80-on-car/, 2 pages.
Litman, Todd, "Autonomous Vehicle Implementation Predictions Implications for Transport Planning," Victoria Transport Policy Institute, Dec. 23, 2013, 19 pages.
Zeng, X., Yin, K., and Ge, H., "Hazardous Driving Prediction System," Submission to the Connected Vehicle Technology Challenge, Sep. 24, 2014, 20 pages.
Jan. 15, 2015—U.S. Non-Final Office Action—U.S. Appl. No. 14/163,761.
Jan. 21, 2015—U.S. Non-Final Office Action—U.S. Appl. No. 14/163,719.
Jan. 29, 2016—U.S. Notice of Allowance and Fee(s) Due—U.S. Appl. No. 14/163,741.
Mar. 17, 2016—U.S. Notice of Allowance and Fee(s) Due—U.S. Appl. No. 14/163,761.

(56) References Cited

OTHER PUBLICATIONS

Apr. 7, 2016—U.S. Non-Final Office Action—U.S. Appl. No. 14/163,719.
Mar. 18, 2016—(WO) International Search Report—App PCT/US2016/013204.
Mar. 18, 2016—(WO) Search Report and Written Opinion—App PCT/US2016/013204.
Apr. 19, 2018—U.S. Final Office Action—U.S. Appl. No. 14/458,764.
VentureBeat.com webpage; "Cisco and NXP encourage car communication to make driving safer" www.venturebeat.com/2013/01/04/cisco-and-nxp-encourage-car-communication-to-make-driving-safert, Rebecca Grant dated Jan. 4, 2013.
Yang et al., "A vehicle-to-vehicle communication protocol for cooperative collision warning"; Aug. 2004.
Festag et al., "Vehicle-to-vehicle and road-side sensor communication for enhanced road safety"; Nov. 2008.
Zalstein, David, Car Advice. com webpage, "First large-scale vehicle-to-vehicle communication technology test unveiled" dated Aug. 22, 2012, www.caradvice.com.au/187379/tirst-large-scale-vehicle-to-vehicle-communication-technology-test-unveiled/basic-rgb-4/, 3 pages.
BMW.com webpage; "BMW Technology Guide: Car-to-car communication" www.bmw.com/com/en/insights/technology/technology_guide/articles/cartocar_communication.html; downloaded Apr. 5, 2013.
NEC.com webpage; "Car2Car Communication" www/nec.com/en/global.onlinetv/en/society/car_commu_I:html; downloaded Apr. 5, 2013.
Xu, Qing et al., "Vehicle-to-Vehicle Safety Messaging in DSRC"; 2004.
EE Herald webpage, "DSRC Packet Sniffer, a vehicle-to-vehicle communication technology is under demo"; www.eeherald.com/section/news/nw10000198.html; dated Nov. 22, 2008.
Bai, Fan et al., "Reliability Analysis of DSRC Wireless Communication for Vehicle Safety"; Sep. 2006.
Kotani, Kazuya et al., "Inter-Vehicle Communication Protocol for Cooperatively Capturing and Sharing" Intersection Video; date unkown but believed to be before 2011.
BC Technology Webpage; "CarCom Intercom System"; www.bctechnologyltd.co.uk/clarson-intercom-system-brochure.htm; downloaded May 29, 2013.
Wolf Intercom webpage; "Wolf Intercom Systems"; http://wolfintercom.com/, downloaded May 29, 2013.
Telephonics Webpage; "Integrated Communication Systems Wired & Wireless Secure Intercommunications"; www.telephonics.com/netcom.asp; downloaded May 29, 2013.
Car-to-Car webpage; "Car-2-Car Communication"; www.car-to-car.org/index.php?id=8; downloaded May 29, 2013.
Cohda Wireless webpage; www.cohdawireless.com/default.html; downloaded May 29, 2013.
Eichler, Stephen et al., "Car-to-Car Communication" dated Oct. 2006.
Oki Webpage "OKI Develops World's First DSRC Inter-vehicle Communication Attachment for Mobile Phones to Help Pedestrian Safety" dated Jan. 8, 2009.
Light, Donald, "A Scenario: The End of Auto Insurance," May 8, 2012, downloaded Nov. 11, 2013 from ww.celent.com/reports/scenario-end-auto-insurance, 2 pages.
"Driver Assistance Systems," Robert Bosch GmbH, downloaded Oct. 27, 2013 from www.bosch-automotivetechnology.us/en_us/us/driving_comfort 1/driving_comfort_systems_for passenger cars_2/driver_assistance_systems_5/driver_assistan . . . 12 pages.
"Autonomous Car," Wikipedia, the free encyclopedia, downloaded Nov. 11, 2013 from en.wikipedia.org/wiki/Autonomous_car#cite_ref-28, 20 pages.
"Schlaue Autos von a bis Z." Encyclopedia, downloaded Oct. 27, 2013 from www.bester-beifahrer.de/startseite/exikon/, 15 pages.
"Chassis Systems Control, Adaptive Cruise Control: More comfortable driving," Robert Bosch GmbH, Brochure downloaded Oct. 26, 2013, 4 pages.
"Get Ready for Automated Cars," Houston Chronicle, Sep. 11, 2012, downloaded Nov. 11, 2013, 1 page.
Levy, Steven, Salmon, Felix, Stokes, Jon, "Artificial Intelligence is Here. In Fact, It's All Around Us. But It's Nothing Like we Expected," Jan. 2011, 14 pages.
"Driverless cars study: 1 in 5 would let computers do the driving," Nov. 4, 2013, downloaded Dec. 19, 2013 from http://www.carinsurance.com/press/driverless-cars-survey-results.aspx, 2 pages.
Shladover, Steven E. "What if Cars Could Drive Themselves," Access Magazine, University of California Transportation Center, UC Berkeley, Apr. 1, 2000, downloaded Dec. 19, 2013, 7 pages.
Kim, Mun Hyun, Dickerson, Julie, Kosko, Bart, "Fuzzy throttle and brake control for platoons of smart cars," University of Southern California, Received May 1995, revised Aug. 1995, downloaded Dec. 19, 2013, 26 pages.
"A velocity control strategy for vehicular collision avoidance system," Abstract downloaded on May 9, 2013 from ieeexplore.ieee.org/xpl/articleDetails.jsp?tp=8,amp;arnumber=16268388,amp;contentType=Conference+Publications&queryText%3DA+velocity+control+strategy+for . . . , 1 page.
"Fuzzy system representation of car-following phenomena," Abstract downloaded on May 9, 2013 from ieeexplore.ieee.org/xpl/articleDetails.jsp?tp=&arnumber=527798&contentType=Conference+Publications&queryText%3DFuzzy+system+representation+of . . . , 1 page.
"Direct adaptive longitudinal control of vehicle platoons," Abstract downloaded on May 9, 2013 from ieeexplore.ieee.org/xpl/articleDetails.jsp?tp=&arnumber=917908&contentType=Journals+%26+Magazines&queryText%3DDirect+adaptive+longitudinal+c . . . , 1 page.
Sharma, Devansh, "Development of Leader-Follower Robot in IIT BOMBAY," 4 pages.
Noguchi, Noboru, Will, Jeff, Reid, Joh, and Zhang, Qin, "Development of a master-slave robot system for farm operations," Computers and Electronics in Agriculture 44 (2004), 19 pages.
"Project SARTRE (Safe Road Trains for the Environment)," Road Traffic Technology, downloaded on May 9, 2013 from www.roadtraffic-technology.com/projects/the-sartre-project/, 3 pages.
"A semi-autonomous tractor in an intelligent master-slave vehicle system," Oct. 2010, vol. 3, Issue 4, pp. 263-269, downloaded Dec. 19, 2013 from http://link.springer.com/article/10.1007%2Fs11370-010-0071-6, 4 pages.
"Development of an intelligent master-slave system between agricultural vehicles," Abstract downloaded on Dec. 19, 2013 from http://ieeexplore.ieee.org/xpl/login.jsp?tp=&arnumber=5548056&url=http%3A%2F%2Fi . . . , 1 page.
"A leader-follower formation flight control scheme for UAV helicopters," Abstract downloaded on Dec. 19, 2013 from http://ieeexplore.ieee.org/xpl/login.jsp?tp=&arnumber=4636116&url=http%3A%2F%2Fi . . . , 1 page.
Kurian, Bonny, "Auto-Insurance—Driving into the sunset?", Tala Consultancy Services, 2013.
O'Brien, Christine, "Autonomous Vehicle Technology: Consideration for the Auto Insurance Industry", University Transportation Resource Center (The 2nd Connected Vehicles Symposium, Rutgers University), Jun. 17, 2013.
Anderson, James M. et al., "Autonomous Vehicle Program: A Guide for Policymakers", Rand Corporation: Transportation, Space, and Technology Program, 2014.
Marchant, Gary E. et al., "The Coming Collision Between Autonomous Vehicles and the Liability System", Santa Clara Law Review (vol. 52: No. 4 (Article 6)), Dec. 17, 2012.
"The Munix Advantage", AUMA, retrieved Apr. 8, 2014, <http://www.auma.ca/live/digitalAssets/71/71248_MUNIX_onepager.pdf>.
"The Use of Occupation and Education Factors in Automobile Insurance", State of New Jersey: Department of Banking and Insurance, Apr. 2008.
"Preliminary Statement of Policy Concerning Automated Vehicles", National Highway Traffic Safety Administration, retrieved Jun. 9, 2014.
Walker Smith, Bryant, "Summary of levels of Driving Automation for On-Road Vehicles", Stanford Law School: The Center for

(56) References Cited

OTHER PUBLICATIONS

Internet and Society, Dec. 18, 2013, <http://cyberlaw.stanford.edu/blog/2013/12/sae-levels-driving-automation>.
Auto Insurance Discounts, Liberty Mutual Insurance, downloaded from htbp://www.libertymutual.com/auto-insurance/auto-insurance-coverage/auto-insurance-discounts, Jan. 8, 2014, 2 pages.
Autonomous Vehicles Regulations, California Department of Motor Vehicles, 2011, downloaded from www.dmv.ca.gov/vr/autonomous/auto.htm, Jan. 2, 2014, 3 pages.
Sharma, Aroma, Autonomous Vehicle Conf Recap 2012: "Driving the Future: The Legal Implications of Autonomous Vehicles," High Tech Law Institute, downloaded from law.scu.edu/hightech/autonomousvehicleconfrecap2012/, Jan. 2, 2014, 7 pages.
Strumpf, Dan, "Corporate News: Driverless Cars Face Issues of Liability", Strumpf Dan, The Wall Street Journal Asia [Hong Kong ] Jan. 29, 2013: 19, downloaded from http://search.proquest.com.ezproxy, Jan. 8, 2014, 2 pages.
Lienert, Anita, Drivers Would Opt for Autonomous Cars to Save on Insurance, Study Finds: Published: Nov. 7, 2013, downloaded from www.edmunds.com/car-news/drivers-would-opt-for-autonomous-cars-to-save-on-insurance-study-finds.html on Jan. 2, 2014, 6 pages.
Neumann, Peter G. and Contributors, "Risks to the Public," ACM SIGSOFT Software Engineering Notes, Jul. 2012 vol. 37 No. 4, pp. 20-29.

\* cited by examiner

ROAD SEGMENT SAFETY RATING

CROSS REFERENCE TO RELATED APPLICATIONS

This application is a continuation-in-part of, and claims priority to, co-pending U.S. application Ser. No. 14/100,913, filed Dec. 9, 2013, which is a continuation of U.S. patent application Ser. No. 12/118,021, filed May 9, 2008, issued Dec. 10, 2013 as U.S. Pat. No. 8,606,512, which claims priority to U.S. Provisional Patent Application No. 60/917,169 filed May 10, 2007. All of the aforementioned are incorporated by reference in their entirety herein.

TECHNICAL FIELD

Aspects of the invention relate generally to risk mitigation. More particularly, aspects of the invention relate to using geographically encoded information to promote and/or reward risk mitigation. Various aspects of the disclosure relate to road segment safety rating systems. More specifically, aspects of the disclosure relate to determining a road segment safety rating based on historical road segment data and/or driving behavior data of an operator of a vehicle, determining whether the road segment safety rating is above a pre-determined threshold, providing alternate road segments to a user, providing insurance incentives to a user based on the road segment safety rating, and/or providing real-time (or near real-time) alerts or warnings to a user about upcoming safety hazards.

BACKGROUND

Although insurers may vary insurance premiums based on garaging location (by state, county, etc.), there is a need in the art for enhanced systems and methods to better account for variations in a location-based risk to vehicles and subsequently acting accordingly. For example, some insurers use location-based technology such as GPS (global positioning satellites) to monitor the location of vehicles. Nevertheless, there is a need in the art for a technique for estimating the risk associated with a route using the various aspects disclosed by the present disclosure.

Often, when operating a vehicle, drivers do not consider safety of a road or route they are taking when making decisions on how to arrive at a destination. Rather, drivers often rely on criteria such as fastest route, shortest distance, etc. to plan a route to a destination. Because the amount of data needed to determine a safety rating for a road can be tremendous, it is often not practical for individuals to evaluate the safety of each road. However, access to this information could be advantageous. Therefore, there is a benefit in the art for an enhanced method and device for calculating a risk for a road segment and using it to, among other things, mitigate risk.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, systems and apparatuses for determining a road segment safety rating. In some arrangements, the road segment safety rating may be based on historical data associated with the road segment (e.g., accident history data, traffic volume data, etc.). In other examples, the road segment safety rating may be based on historical data as well as driving behavior data of the operator of the vehicle. For instance, driving behaviors of the user may be determined based on, for instance, sensor data received from the vehicle. This driving behavior data may be used with the historical data to determine a road segment safety rating that is particular or unique to the driver or user. In still other examples, the road segment safety rating may be based on external or environmental factors, such as weather, current traffic, accidents, etc. that may impact the real-time risk associated with a road segment. Various combinations of these factors may also be used to determine a road segment safety rating.

In some examples, the determined road segment safety rating may be compared to a threshold. If the road segment safety rating is below the threshold, the system may generate one or more alternate road segments or route for the driver to consider. In some examples, the road segment safety rating may be used to determine an insurance premium or one or more insurance incentives to provide to the user.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

Figure 1:
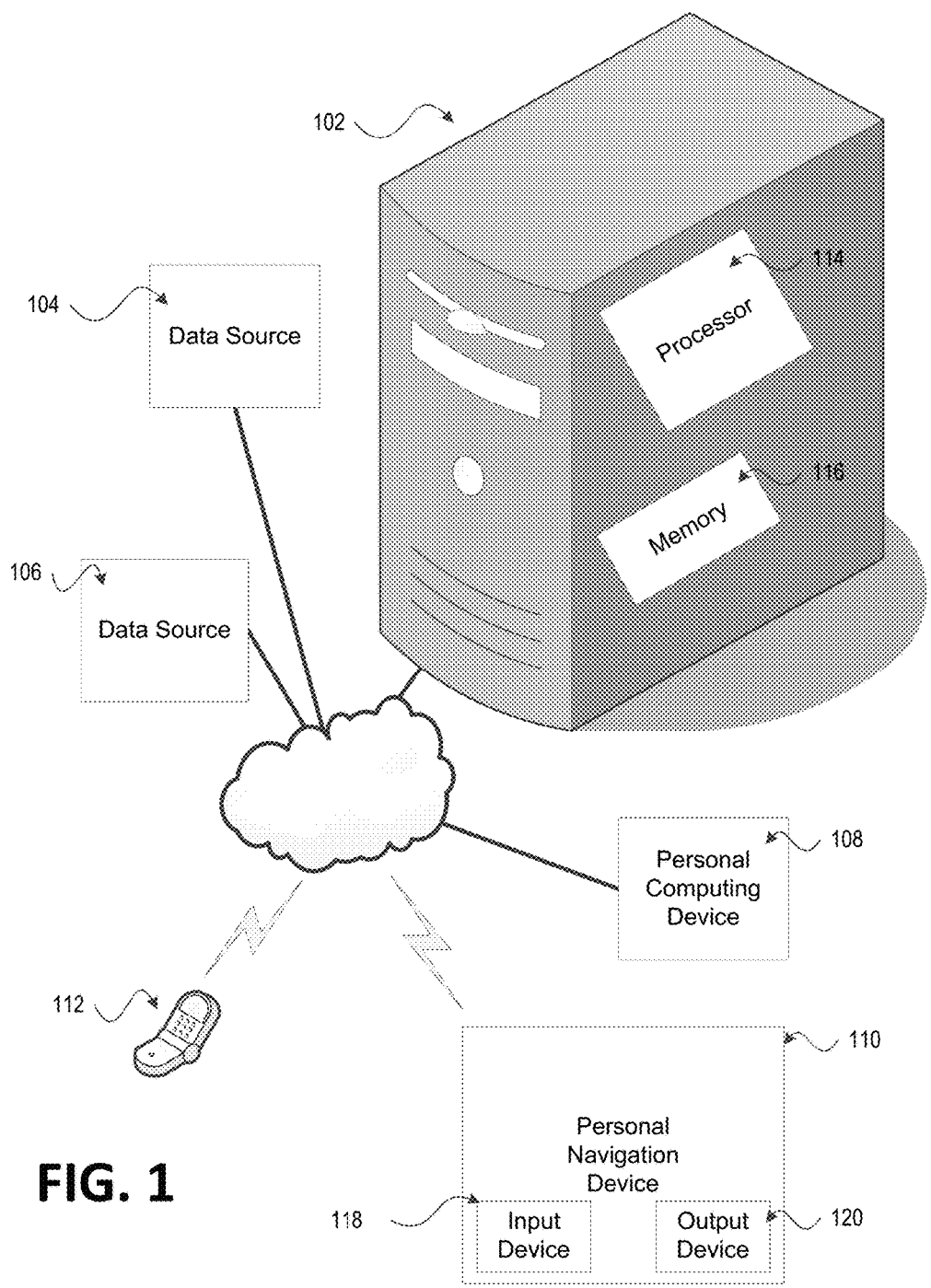
FIG. 1 depicts an illustrative operating environment in accordance with aspects of the invention.

It will be apparent to one skilled in the art after review of the entirety disclosed that the steps illustrated in the figures listed above may be performed in other than the recited order, and that one or more steps illustrated in these figures may be optional.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with aspects of the invention, a new set of pricing tiers are disclosed herein for enabling safe driving and lower rates for insurance policy customers. In addition, various approaches to helping users mitigate risk are presented. In accordance with aspects of the invention, a computing device is disclosed for generating risk values in a data store. The system may receive various types of information, including but not limited to, accident information, geographic information, and vehicle information, from one or more data sources and calculate a risk value for associated road segments. Subsequently, the computing device may provide the associated risk value when provided with location information for a road segment such as regional location information and/or other information.

In an alternate embodiment in accordance with aspects of the invention, a personal navigation device, mobile device, and/or personal computing device may communicate with the database of risk values. The devices may receive information about a travel route and use that information to retrieve risk values for road segments in the travel route. The aggregate of the risk values is sent for display on a screen of the device or for recording in memory of the device. The contents of memory may also be uploaded to a data store for use by, e.g., insurance companies, to determine whether to adjust a quote for insurance coverage or one or more aspects of current insurance coverage such as premium, specific coverages, specific exclusions, rewards, special terms, etc.

In yet another embodiment, in accordance with aspects of the invention, a personal navigation device, mobile device, and/or personal computing device may access the database of risk values to assist in identifying and presenting alternate low-risk travel routes. The driver may select among the various travel routes presented, taking into account his/her tolerance for risk. Depending on the driver's selection, the vehicle's insurance policy may be adjusted accordingly, for either the current insurance policy or a future insurance policy.

Referring to FIG. 1, an example of a suitable operating environment in which various aspects of the invention may be implemented is shown in the architectural diagram of FIG. 1. The operating environment is only one example of a suitable operating environment and is not intended to suggest any limitation as to the scope of use or functionality of the invention. Other operating environments, systems, and the like will be described herein (e.g., in association with FIG. 13). The operating environment may be comprised of one or more data sources 104, 106 in communication with a computing device 102. The computing device 102 may use information communicated from the data sources 104, 106 to generate values that may be stored in a conventional database format. In one embodiment, the computing device 102 may be a high-end server computer with one or more processors 114 and memory 116 for storing and maintaining the values generated. The memory 116 storing and maintaining the values generated need not be physically located in the computing device 102. Rather, the memory (e.g., ROM, flash memory, hard drive memory, RAID memory, etc.) may be located in a remote data store (e.g., memory storage area) physically located outside the computing device 102, but in communication with the computing device 102.

A personal computing device 108 (e.g., a personal computer, tablet PC, handheld computing device, personal digital assistant, mobile device, etc.) may communicate with the computing device 102. Similarly, a personal navigation device 110 (e.g., a global positioning system (GPS), geographic information system (GIS), satellite navigation system, mobile device, other location tracking device, etc.) may communicate with the computing device 102. The communication between the computing device 102 and the other devices 108, 110 may be through wired or wireless communication networks and/or direct links. One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 102 and other devices (e.g., devices 108, 110) may be connected to one or more of the networks via twisted pair wires, coaxial cable, fiber optics, radio waves or other media. The term "network" as used herein and depicted in the drawings should be broadly interpreted to include not only systems in which devices and/or data sources are coupled together via one or more communication paths, but also stand-alone devices that may be coupled, from time to time, to such systems that have storage capability.

In another embodiment in accordance with aspects of the invention, a personal navigation device 110 may operate in a stand-alone manner by locally storing some of the database of values stored in the memory 116 of the computing device 102. For example, a personal navigation device 110 (e.g., a GPS in an automobile) may be comprised of a processor, memory, and/or input devices 118/output devices 120 (e.g., keypad, display screen, speaker, etc.). The memory may be comprised of a non-volatile memory that stores a database of values used in calculating an estimated route risk for identified routes. Therefore, the personal navigation device 110 need not communicate with a computing device 102 located at, for example, a remote location in order to calculate identified routes. Rather, the personal navigation device 110 may behave in a stand-alone manner and use its processor to calculate route risk values of identified routes. If desired, the personal navigation device 110 may be updated with an updated database of values after a period of time (e.g., an annual patch with new risk values determined over the prior year).

In yet another embodiment in accordance with aspects of the invention, a personal computing device 108 may operate in a stand-alone manner by locally storing some of the database of values stored in the memory 116 of the computing device 102. For example, a personal computing device 108 may be comprised of a processor, memory, input device (e.g., keypad, CD-ROM drive, DVD drive, etc.), and output device (e.g., display screen, printer, speaker, etc.). The memory may be comprised of CD-ROM media that stores values used in calculating an estimated route risk for an identified route. Therefore, the personal computing device 108 may use the input device to read the contents of the CD-ROM media in order to calculate a value for the identified route. Rather, the personal computing device 108 may behave in a stand-alone manner and use its processor to calculate a route risk value. If desired, the personal computing device 108 may be provided with an updated database of values (e.g., in the form of updated CD-ROM media) after a period of time. One skilled in the art will appreciate that personal computing device 108, 110, 112 need not be personal to a single user; rather, they may be shared among members of a family, company, etc.

The data sources 104, 106 may provide information to the computing device 102. In one embodiment in accordance with aspects of the invention, a data source may be a computer which contains memory storing data and is configured to provide information to the computing device 102. Some examples of providers of data sources in accordance with aspects of the invention include, but are not limited to, insurance companies, third-party insurance data providers, government entities, state highway patrol departments, local law enforcement agencies, state departments of transportation, federal transportation agencies, traffic information services, road hazard information sources, construction information sources, weather information services, geographic information services, vehicle manufacturers, vehicle safety organizations, and environmental information services. For privacy protection reasons, in some embodiments of the invention, access to the information in the data sources 104, 106 may be restricted to only authorized computing devices 102 and for only permissible purposes. For example, access to the data sources 104, 106 may be restricted to only those persons/entities that have signed an agreement (e.g., an electronic agreement) acknowledging their responsibilities with regard to the use and security to be accorded this information.

The computing device 102 uses the information from the data sources 104, 106 to generate values that may be used to calculate an estimated route risk. Some examples of the information that the data sources 104, 106 may provide to the computing device 102 include, but are not limited to, accident information, geographic information, and other types of information useful in generating a database of values for calculating an estimated route risk.

Some examples of accident information include, but are not limited to, loss type, applicable insurance coverage(s) (e.g., bodily injury, property damage, medical/personal injury protection, collision, comprehensive, rental reimbursement, towing), loss cost, number of distinct accidents for the segment, time relevancy validation, cause of loss (e.g., turned left into oncoming traffic, ran through red light, rear-ended while attempting to stop, rear-ended while changing lanes, sideswiped during normal driving, sideswiped while changing lanes, accident caused by tire failure (e.g., blow-out), accident caused by other malfunction of car, rolled over, caught on fire or exploded, immersed into a body of water or liquid, unknown, etc.), impact type (e.g., collision with another automobile, collision with cyclist, collision with pedestrian, collision with animal, collision with parked car, etc.), drugs or alcohol involved, pedestrian involved, wildlife involved, type of wildlife involved, speed of vehicle at time of incident, direction the vehicle is traveling immediately before the incident occurred, date of incident, time of day, night/day indicator (i.e., whether it was night or day at the time of the incident), temperature at time of incident, weather conditions at time of incident (e.g., sunny, downpour rain, light rain, snow, fog, ice, sleet, hail, wind, hurricane, etc.), road conditions at time of incident (e.g., wet pavement, dry pavement, etc.), and location (e.g., geographic coordinates, closest address, zip code, etc.) of vehicle at time of incident.

Accident information associated with vehicle accidents may be stored in a database format and may be compiled per segment. One skilled in the art will understand that the term segment may be interchangeably used to describe a road segment, intersection, round about, bridge, tunnel, ramp, parking lot, railroad crossing, or other feature that a vehicle may encounter along a route.

Time relevancy validation relates to the relevancy of historical accident information associated with a particular location. Time relevancy validation information may be dynamically created by comparing the time frames of accident information to the current date. For example, if a location or route had many collisions prior to five years ago but few since, perhaps a road improvement reduced the risk (such as adding a traffic light). Time relevancy information may be generated remotely and transmitted by a data source 104, 106 to the computing device 102 like other information. Alternatively, time relevancy information may be calculated at the computing device 102 using other information transmitted by a data source 104, 106. For example, the appropriateness of historical information may be related to the time frame into which the information belongs. Examples of time frames may include, but are not limited to, less than 1 year ago, 1 year ago, 2 years ago, 3 years ago, 4 years ago, 5 to 10 years ago, and greater than 10 years ago. In one embodiment, the more recent the historical information, the greater weight is attributed to the information.

Some examples of geographic information include, but are not limited to, location information and attribute information. Examples of attribute information include, but are not limited to, information about characteristics of a corresponding location described by some location information: posted speed limit, construction area indicator (i.e., whether location has construction), topography type (e.g., flat, rolling hills, steep hills, etc.), road type (e.g., residential, interstate, 4-lane separated highway, city street, country road, parking lot, etc.), road feature (e.g., intersection, gentle curve, blind curve, bridge, tunnel), number of intersections, whether a roundabout is present, number of railroad crossings, whether a passing zone is present, whether a merge is present, number of lanes, width of road/lanes, population density, condition of road (e.g., new, worn, severely damaged with sink-holes, severely damaged with erosion, gravel, dirt, paved, etc.), wildlife area, state, county, and/or municipality. Geographic information may also include other attribute information about road segments, intersections, bridges, tunnels, railroad crossings, and other roadway features.

Location information for an intersection may include the latitude and longitude (e.g., geographic coordinates) of the geometric center of the intersection. The location may be described in other embodiments using a closest address to the actual desired location or intersection. The intersection (i.e., location information) may also include information that describes the geographic boundaries, for example, of the intersection which includes all information that is associated within a circular area defined by the coordinates of the center of the intersection and points within a specified radius of the center. In another example of location information, a road segment may be defined by the latitude and longitude of its endpoints and/or an area defined by the road shape and a predetermined offset that forms a polygon. Segments may comprise intersections, bridges, tunnels, rail road crossings or other roadway types and features. Those skilled in the art will recognize that segments can be defined in many ways without departing from the spirit of this disclosed invention.

Some examples of vehicle information include, but are not limited to, information that describes vehicles that are associated with incidents (e.g., vehicle accidents, etc.) at a particular location (e.g., a location corresponding to location information describing a segment, intersection, etc.) Vehicle information may include vehicle make, vehicle model, vehicle year, and age. Vehicle information may also include information collected through one or more in-vehicle devices or systems such as an event data recorder (EDR), onboard diagnostic system, or global positioning satellite (GPS) device; examples of this information include speed at impact, brakes applied, throttle position, direction at impact, whether lights are on, whether windshield wipers are on, whether airbag deployed, etc. As is clear from the preceding examples, vehicle information may also include information about the driver of a vehicle being driven at the time of an incident. Other examples of driver information may include age, gender, marital status, occupation, alcohol level in blood, credit score, distance from home, cell phone usage (i.e., whether the driver was using a cell phone at the time of the incident), number of occupants.

In one embodiment in accordance with aspects of the invention, a data source 104 may provide the computing device 102 with accident information that is used to generate values (e.g., create new values and/or update existing values). The computing device 102 may use at least part of the received accident information to calculate a value, associate the value with a road segment (or other location information), and store the value in a database format. One skilled in the art will appreciate, after thorough review of the entirety disclosed herein, that there may be other types of information that may be useful in generating a database of values for use in, among other things, calculating an estimated route risk.

For example, in accordance with aspects of the invention, a data source 104 may provide the computing device 102 with geographic information that is used to generate new roadway feature risk values in a database of risk values and/or update existing risk values; where the roadway feature may comprise intersections, road segments, tunnels, bridges, or railroad crossings. Attributes associated with roadways may also be used in part to generate risk values. The computing device 102 may use at least part of the received geographic information to calculate a value, associate the value with a road segment (or other location information), and store the value in a database format. Numerous examples of geographic information were provided above. For example, a computing device 102 may receive geographic information corresponding to a road segment comprising accident information and roadway feature information and then calculate a risk value. Therefore, when calculating a risk value, the system may use, in one example, the geographic information and the accident information (if any accident information is provided). In alternative embodiments in accordance with aspects of the invention, the computing device may use accident information, geographic information, vehicle information, and/or other information, either alone or in combination, in calculating risk values in a database format.

The values generated by the computing device 102 may be associated with a road segment containing the accident location and stored in a data store. Similar to a point of interest (POI) stored in GPS systems, a point of risk (POR) is a road segment or point on a map that has risk information associated with it. Points of risk may arise because incidents (e.g., accidents) have occurred at these points before. In accordance with aspects of the invention, the road segment may be a predetermined length (e.g., ¼ mile) on a stretch of road. Alternatively, road segments may be points (i.e., where the predetermined length is minimal) on a road. Furthermore, in some embodiments, road segment may include one or more different roads that are no farther than a predetermined radius from a road segment identifier. Such an embodiment may be beneficial in a location, for example, where an unusually large number of streets intersect, and it may be impractical to designate a single road for a road segment.

Figure 2:
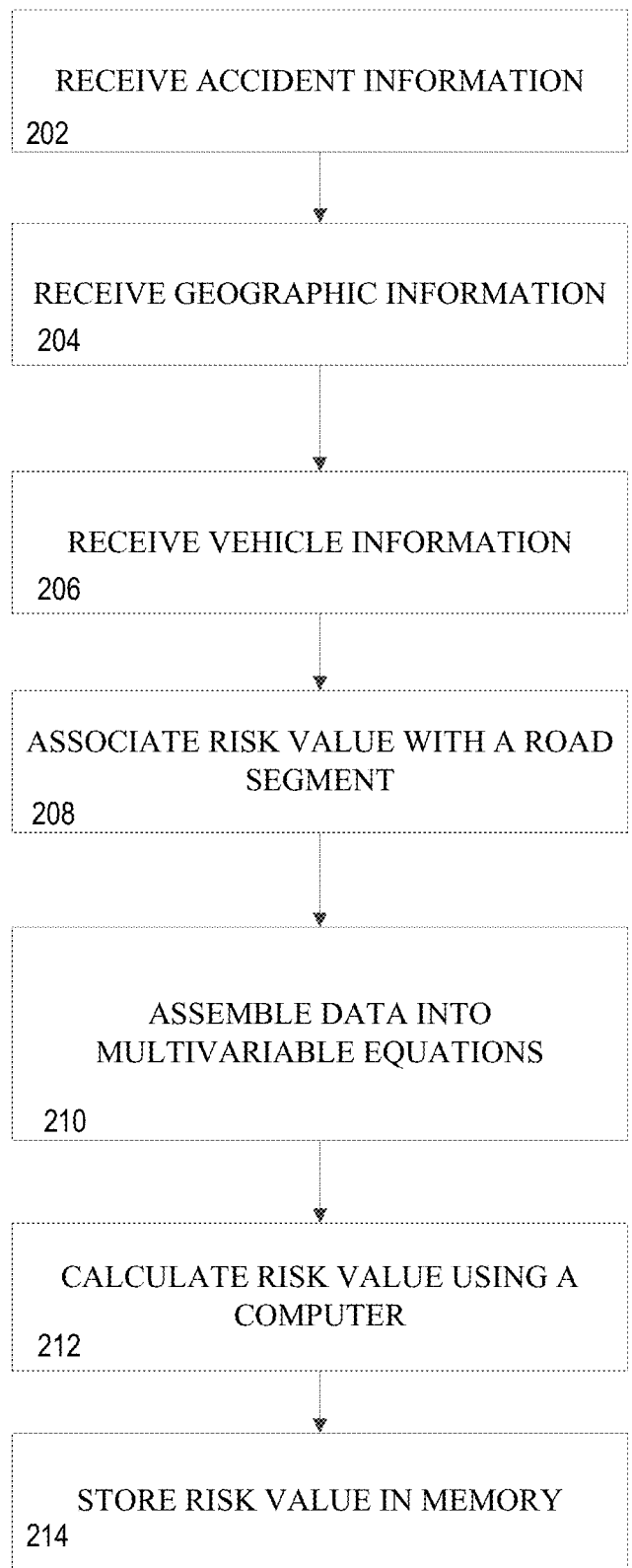
FIG. 2 depicts illustrative steps for calculating the risk value of a route segment by applying actuarial and/or statistical methods in accordance with aspects of the invention.

Referring to FIG. 2, in accordance with aspects of the invention, a computing device 102 may receive accident information (in step 202), geographic information (in step 204), and/or vehicle information (in step 206). The computing device 102 may calculate (in step 212) the risk value for a road segment (or point of risk) by applying actuarial techniques to the information that may be received from data sources 104, 106. In one embodiment, the computing device 102 receives and stores the accident information in a data store with the latitude/longitude and time of the incident. The accident data is associated with a location and combined with other accident data associated with the same location (in step 210). Applying actuarial and/or statistical modeling techniques involving multiple predictors, such as generalized linear models and non-linear models, a risk value may be calculated (212), and the calculated risk value may be recorded in memory (116) (in step 214). The multiple predictors involved in the statistical model used to calculate a risk value may include accident information, geographic information, and vehicle information. Associating the risk value (in step 208) with a line segment and/or point which best pinpoints the area of the road in which the incident(s) occurred may be accomplished by using established GIS locating technology (e.g., GPS ascertaining a geographically determinable address, and assigning the data file to a segment's or intersection's formal address determined by the system). For example, two or more accidents located in an intersection or road segment may have slightly different addresses depending on where within the intersection or segment the accident location was determined to be. Therefore, the system may identify a location based on business rules. In another example business rules may identify an incident location using the address of the nearest intersection. In yet another example the system may identify the location of an incident on a highway using segments based on mileage markers or the lengths may be dynamically determined by creating segment lengths based on relatively equal normalized risk values. Therefore, roadways that have stretches with higher numbers of accidents may have shorter segments than stretches that have fewer accidents. In another example, if the incident occurred in a parking lot, the entire parking lot may be associated with a formal address that includes all accidents located within a determined area. One skilled in the art will appreciate after review of the entirety disclosed that road segment includes a segment of road, a point on a road, and other designations of a location (e.g., an entire parking lot).

For example, an insurance claim-handling processor may collect data about numerous incidents such as collision, theft, weather damage, and other events that cause any one of (or combination of) personal injury, vehicle damage, and damage to other vehicles or property. Information about the accident may be collected through artifacts such as first notice of loss (FNOL) reports and claim adjuster reports and may be stored in one or more data stores used by the insurer. Other data may also be collected at the point and time when the incident occurred, and this information (e.g., weather conditions, traffic conditions, vehicle speed, etc.) may be stored with the other accident information. The information in these data stores may be distributed by data sources 104, 106 in accordance with aspects of the invention. In addition, some information may also be recorded in third-party data sources that may be accessible to one or more insurance companies. For example, traffic information (e.g., traffic volume) and weather information may be retrieved in real-time (or near real-time) from their respective data sources.

Figure 3:
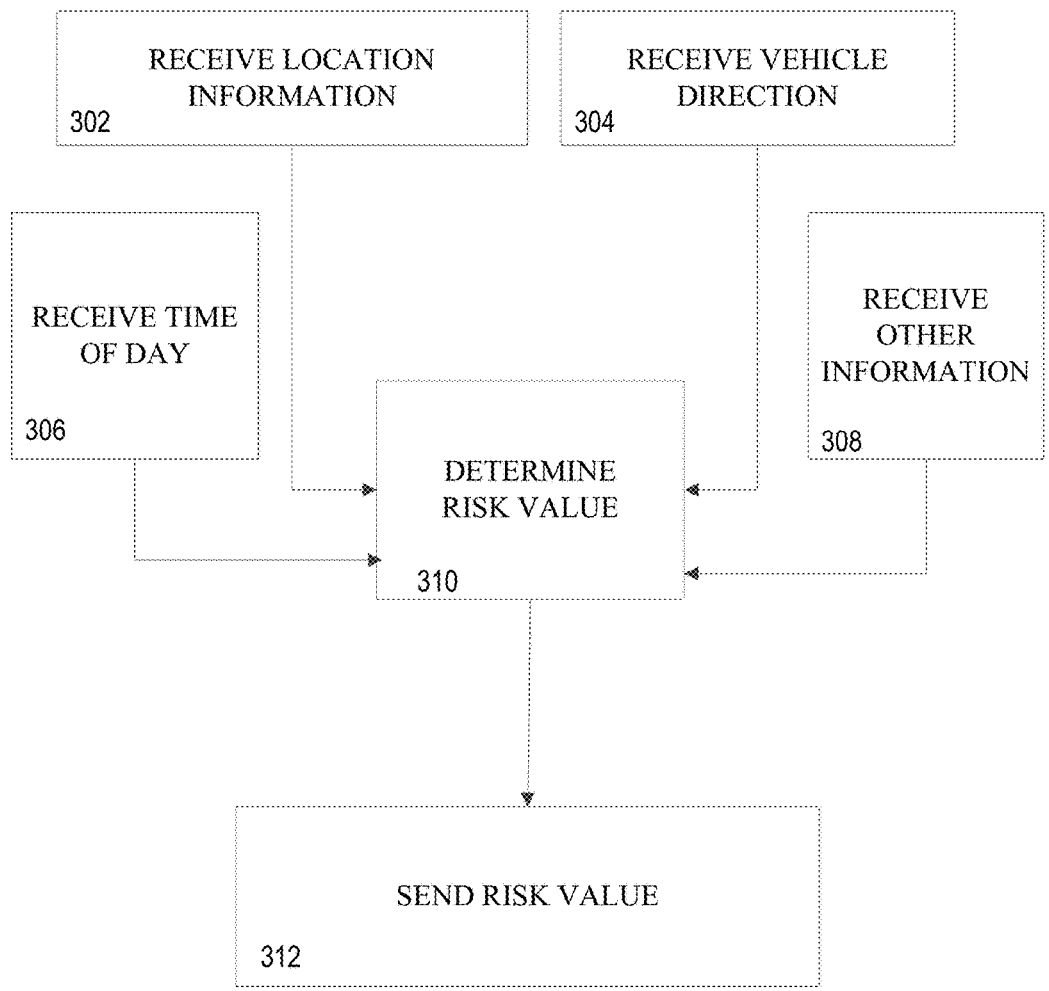
FIG. 3 depicts illustrative steps for determining and providing risk values to a computing device in accordance with aspects of the invention.

Referring to FIG. 3, in accordance with aspects of the invention, the computing device 102 may send (in step 312) the risk value corresponding to a road segment when it receives location information (in step 302) requesting the risk associated with a particular location. The particular location information may be in the form of longitude/latitude coordinates, street address, intersection, closest address, or other form of information. Furthermore, in an alternative embodiment the accuracy of the risk value may be improved by submitting the direction that a vehicle travels (or may travel) through a road segment. The computing device 102 may receive (in step 304) the vehicle direction and use it to determine the risk value associated with the vehicle route. For example, a dangerous intersection demonstrates high risk to a vehicle/driver that passes through it. However, actuarial analysis (e.g., of data showing many recorded accidents at the location) may show that it is more dangerous if the driver is traveling northbound on the road segment and turns left. Therefore, the vehicle direction may also be considered when retrieving the appropriate risk value (in step 310).

Likewise, the computing device 102 may also receive (in step 308) other information to enhance the accuracy of the risk value associated with a travel route. For example, the computing device 102 may receive (in step 306) the time of day when the driver is driving (or plans to drive) through a particular travel route. This information may improve the accuracy of the risk value retrieved (in step 310) for the travel route. For example, a particular segment of road through a wilderness area may have a higher rate of accidents involving deer during the night hours, but no accidents during the daylight hours. Therefore, the time of day may also be considered when retrieving the appropriate risk value (in step 310). In addition, the computing device may receive (in step 308) other information to improve the accuracy of the risk value retrieved (in step 310) for a travel route. Some examples of this other information include, but are not limited to, the vehicle's speed (e.g., a vehicle without a sport suspension attempting to take a dangerous curve at a high speed), vehicle's speed compared to the posted speed limit, vehicle's speed compared to typical or average speed, etc.

In accordance with aspects of the invention, a computer-readable medium storing computer-executable instructions for performing the steps depicted in FIGS. 2 and 3 and/or described in the present disclosure is contemplated. The computer-executable instructions may be configured for execution by a processor (e.g., processor 114 in computing device 102) and stored in a memory (e.g., memory 116 in computing device 102). Furthermore, as explained earlier, the computer-readable medium may be embodied in a non-volatile memory (e.g., in a memory in personal navigation device 110) or portable media (e.g., CD-ROM, DVD-ROM, USB flash, etc. connected to personal computing device 108).

In accordance with aspects of the invention, a personal navigation device 110 may calculate a route risk value for a travel route of a vehicle. The personal navigation device 110 may be located, for example, in a driver's vehicle or in a mobile device 112 with location tracking capabilities. Alternatively, a personal computing device 108 may be used to calculate the route risk value for a travel route of a vehicle.

Figure 4:
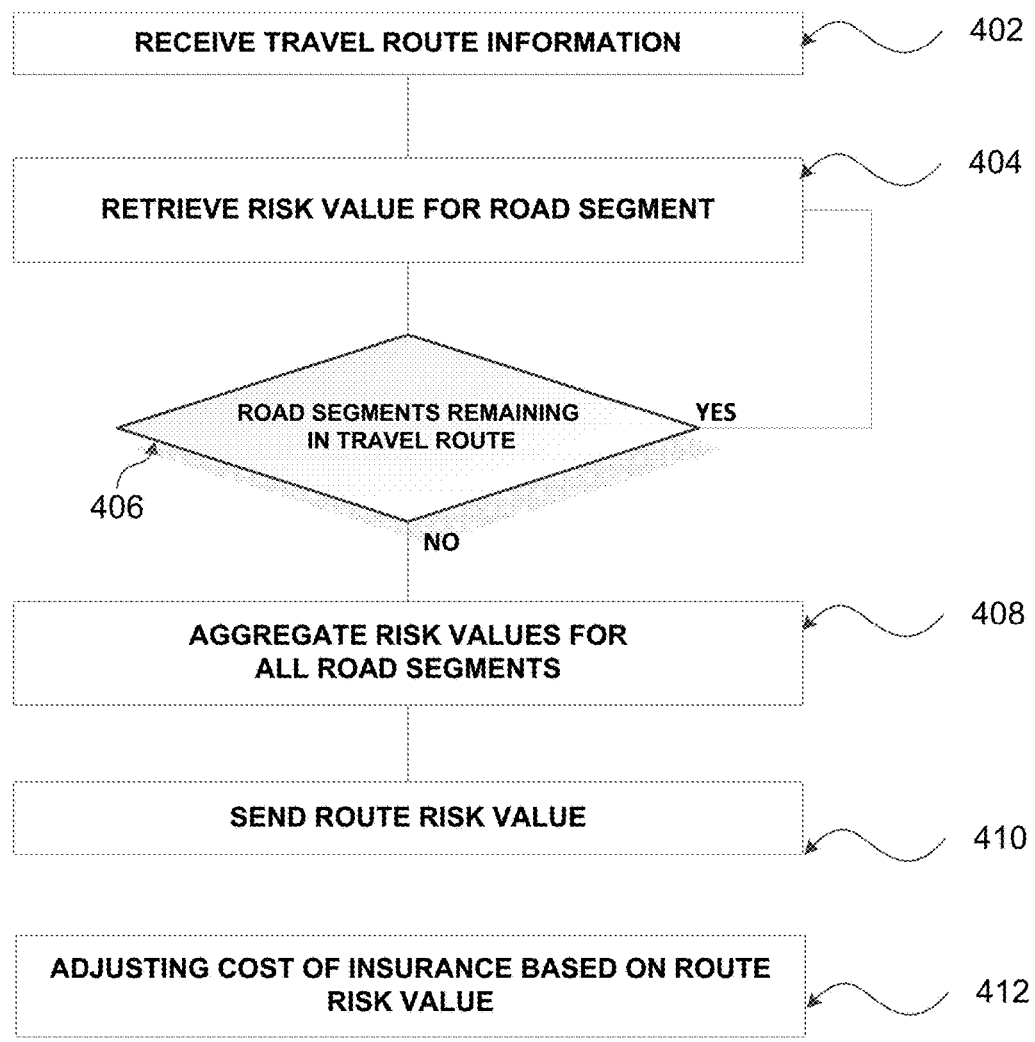
FIG. 4 depicts illustrative steps for calculating the risk value of a travel route in accordance with aspects of the invention.

For example, referring to FIG. 4, a personal navigation device 110 may receive (in step 402) travel route information. The travel route information may include, but is not limited to, a start location, end location, road-by-road directions, and/or turn-by-turn directions. The personal navigation device 110 may use the travel route information and mapping software to determine the road segment upon which the vehicle will travel, and retrieve (in step 404) the risk value for that road segment. For each subsequent road segment remaining in the travel route (see step 406), the personal navigation device 110 may access the database of risk values to retrieve (in step 404) the risk value for that road segment. As explained earlier, the database of risk values may be stored locally to the personal navigation device 110, or may be stored remotely and accessed through a wired/wireless link to the data store.

The risk values retrieved (in step 404) for the travel route may be aggregated (in step 408) and a total risk value for the travel route may be sent (in step 410). In an alternate embodiment, the computing device 102 may count the number of each type of road risk along the travel route based on the values stored in the database. This number may then be multiplied by a risk-rating factor for the respective risk type. A risk type may comprise intersections, locations of past accidents along a route, railroad crossings, merges, roadway class (residential, local, commercial, rural, highways, limited access highways). Other risk types may include proximity to businesses that sell alcohol, churches or bingo parlors.

The sum of this product over all risk types may, in this alternate embodiment, equal the total route risk value. The total route risk value may be divided by the distance traveled to determine the route risk category for the travel route. For example, a route risk category may be assigned based on a set of route risk value ranges for low, medium, and high risk routes.

After being aggregated, the total risk value may be sent (in step 410) to a viewable display on the personal navigation device 110 or may be audible via a voice alert. Alternatively, the total risk value may be sent (in step 410) to a local/remote memory where it may be recorded and/or monitored. For example, it may be desirable for a safe driver to have her total risk value for all travel routes traveled over a time period to be uploaded to an insurance company's data store. The insurance company may then identify the driver as a lower-risk driver (e.g., a driver that travels on statistically lower-risk routes during lower-risk times) and provide the driver/vehicle with a discount and/or credit (in step 412) on an existing insurance policy (or towards a future insurance policy). At least one benefit of the aforementioned is that safe drivers are rewarded appropriately, while high-risk drivers are treated accordingly.

In some embodiments in accordance with aspects of the invention, the route risk value sent (in step 410) may be in the form of a number rating the risk of the travel route (e.g., a rating of 1 to 100 where 1 is very low risk and 100 is very high risk). Alternatively, the route risk value may be in the form of a predetermined category (e.g., low risk, medium risk, and high risk). At least one benefit of displaying the route risk value in this form is the simplicity of the resulting display for the driver. For example, an enhanced GPS unit may display a route (or segment of a route) in a red color to designate a high risk route, and a route may be displayed in a green color to designate a lower risk route. At least one benefit of a predetermined category for the route risk value is that it may be used as the means for comparing the amount of risk associated with each travel route when providing alternate routes. In addition, the enhanced GPS unit may alert the driver of a high risk road segment and offer the driver an incentive (e.g., monetary incentive, points, etc.) for avoiding that segment.

In accordance with aspects of the invention, a computer-readable medium storing computer-executable instructions for performing the steps depicted in FIG. 4 and/or described in the present disclosure is contemplated. The computer-executable instructions may be configured for execution by a processor (e.g., a processor in personal navigation device 110) and stored in a memory (e.g., flash memory in device 110).

When retrieving risk values, in accordance with aspects of the invention, one or more techniques, either alone or in combination, may be used for identifying and calculating the appropriate risk value for road segments. For example, under an accident cost severity rating (ACSR) approach, each point of risk has a value which measures how severe the average accident is for each point of risk. The value may be normalized and/or scaled by adjusting the range of the values. For example, under an ACSR approach using a range of values from 1 to 10: considering all accidents that occur in a predetermined area (e.g., road segment, state, zip code, municipality, etc.), the accidents in the top ten percentile of expensive accidents in that territory would get a 10 value and the lowest 10 percentile of costly accidents in that region would get a 1 value. The actual loss cost may be calculated by summing the various itemized loss costs (e.g., bodily injury, property damage, medical/personal injury protection, collision, comprehensive, uninsured/underinsured motorist, rental reimbursement, towing, etc.).

In an alternate embodiment, the ACSR approach may attribute varying weights to the different types of loss costs summed to calculate the actual loss cost. For example, after analyzing the information, certain portions of a loss cost (e.g., medical cost) may indicate risk more accurately than others. The importance of these portions may be weighted more heavily in the final loss cost calculation. Actuarial methods may be used to adjust loss cost data for a segment where a fluke accident may cause the calculated risk value to far exceed the risk value based on all the other data.

Under the accidents per year (APYR) approach, in accordance with aspects of the invention, each point of risk has a risk value that may reflect the average number of accidents a year for that individual point of risk. Under a modified APYR approach, the risk value for a point of risk continues to reflect the average number of accidents a year, but attributes a lesser weight to accidents that occurred a longer time ago, similar to time relevancy validation (e.g., it gives emphasis to recent accident occurrences over older occurrences).

Under the risk severity (RSR) approach, in accordance with aspects of the invention, each point of risk has a risk value that may reflect the severity of risk for that individual point of risk. For example, an intersection that is a frequent site of vehicle accident related deaths may warrant a very high risk value under the RSR approach. In one embodiment, risk severity rating may be based on accident frequency at intersections or in segments over a determined period of time. In another embodiment, the rating may be based on loss costs associated to intersections and segments. Yet another embodiment may combine accident frequency and severity to form a rating for a segment or intersection. One skilled in the art can recognize that risk severity ratings may be based on one or a combination of factors associated with intersections or segments.

Under the Environmental Risk Variable (ERV) approach, in accordance with aspects of the invention, each point of risk has a risk value that may reflect any or all information that is not derived from recorded accidents and/or claims, but that may be the (direct or indirect) cause of an accident. In one embodiment, the risk value under the ERV approach may be derived from vehicle information transmitted by a data source 104, 106. In an alternate embodiment, the EVR approach may use compound variables based on the presence or absence of multiple risk considerations which are known to frequently, or severely, cause accidents. A compound variable is one that accounts for the interactions of multiple risk considerations, whether environmental or derived from recorded accidents and/or claims. For example, driving through a wildlife crossing zone at dusk would generate a greater risk value than driving through this same area at noon. The interaction of time of day and location would be the compound variable. Another example may consider current weather conditions, time of day, day of the year, and topography of the road. A compound variable may be the type of infrequent situation which warrants presenting a verbal warning to a driver (e.g., using a speaker system in a personal navigation device 110 mounted in a vehicle) of a high risk route (e.g., a high risk road segments).

Another possible approach may be to calculate the route risk value using one or more of the approaches described above divided by the length of the route traveled. This may provide an average route risk value for use in conjunction with a mileage rating plan. In one embodiment, the system combines route risk and conventional mileage data to calculate risk per mile rating.

In one embodiment, a device in a vehicle (e.g., personal navigation device 110, mobile device 112, etc.) may record and locally store the route and/or the route and time during which a route was traveled. This travel route information may be uploaded via wireless/wired means (e.g., cell phones, manually using a computer port, etc.). This travel route information may be used to automatically query a data source 104, 106 for route rating information and calculate a total risk value.

Some accident data may be recorded and locally stored on a device (e.g., personal navigation device 110, mobile device 112, etc.) that provides incident location and a timestamp that can be used to synchronize other data located in data sources 104 and 106. The captured information may be periodically uploaded to computing device 102 for further processing of accident data for updating the road segment database in memory 116. In some embodiments, the other data may include local weather conditions, vehicle density on the roadway, and traffic signal status. Additional information comprising data from an in-vehicle monitoring system (e.g., event data recorder or onboard diagnostic system) may record operational status of the vehicle at the time of the incident. Alternatively, if the vehicle did not have a location tracking device, an insurance claims reporter may enter the address and other information into the data source manually. If the vehicle was configured with an in-vehicle monitoring system that has IEEE 802.11 Wi-Fi capabilities (or any other wireless communication capabilities), the travel route information may be periodically uploaded or uploaded in real-time (or near real-time) via a computer and/or router. The in-vehicle (or on-board vehicle) monitoring system may be configured to automatically upload travel route information (and other information) through a home wireless router to a computer. In some advanced monitoring systems, weather and traffic data (and other useful information) may be downloaded (in real-time or near real-time) to the vehicle. In some embodiments, it may be desirable to use mobile devices 112 (with the requisite capabilities) to transmit the information, provide GPS coordinates, and stream in data from other sources.

The risk types described above may be variables in a multivariate model of insurance losses, frequencies, severities, and/or pure premiums. Interactions of the variables would also be considered. The coefficient the model produces for each variable (along with the coefficient for any interaction terms) would be the value to apply to each risk type. The personal navigation device 110 may initially provide the quickest/shortest route from a start location A to an end location B, and then determine the route risk value by determining either the sum product of the number of each risk type and the value for that risk type or the overall product of the number of each risk type and the value for that risk type. (Traffic and weather conditions could either be included or excluded from the determination of the route risk value for comparison of routes. If not included, an adjustment may be made to the route risk value once the route has been traveled). The driver may be presented with an alternate route which is less risky than the initial route calculated, as will be discussed more fully herein. The personal navigation device 110 may display the difference in risk between the alternate routes and permit the driver to select the preferred route. In some embodiments in accordance with the invention, a driver/vehicle may be provided a monetary benefit (e.g., a credit towards a future insurance policy) for selecting a less risky route.

In one example in accordance with aspects of the invention, a driver may enter a starting location and an end location into a personal navigation device 110. The personal navigation device 110 may present the driver with an illustrative 2-mile route that travels on a residential road near the following risks: 5 intersections, 3 past accident sites, 1 railroad crossing, and 1 lane merging site. Assuming for illustrative purposes that the following risk values apply to the following risk types:

| Risk Type | Risk-rating Factor |
|---|---|
| Intersections | 55 |
| Past Accidents | 30 |
| Railroad Crossing | 5 |
| Merge | 60 |
| Residential Road | 2 per mile |

Then, the route risk value for the entire 2-mile route may be calculated, in one embodiment of the invention, as follows:

| Risk Type | Risk-rating Factor | Count | Product |
|---|---|---|---|
| Intersections | 55 | 5 | 55*5 = 275 |
| Past Accidents | 30 | 3 | 30*3 = 90 |
| Railroad Crossing | 5 | 1 | 5*1 = 5 |
| Merge | 60 | 1 | 60*1 = 60 |
| Residential Road | 2 per mile | 2 | 2*2 = 4 |
| Sum Total | | | 434 |

Assuming a route risk value between 0 and 350 (per mile) is categorized as a low-risk route, then the aforementioned 2-mile route's risk value of 217 (i.e., 434 divided by 2) classifies it a low-risk route.

In some embodiments, for rating purposes the route risk value may consider the driving information of the driver/vehicle. For example, the personal navigation device 110 (or other device) may record the route taken, as well as the time of day/month/year, weather conditions, traffic conditions, and the actual speed driven compared to the posted speed limit. The current weather and traffic conditions may be recorded from a data source 104, 106. Weather conditions and traffic conditions may be categorized to determine the risk type to apply. The posted speed limits may be included in the geographic information. For each segment of road with a different posted speed limit, the actual speed driven may be compared to the posted speed limit. The difference may be averaged over the entire distance of the route. In addition, various techniques may be used to handle the amount of time stopped in traffic, at traffic lights, etc. One illustrative technique may be to only count the amount of time spent driving over the speed limit and determine the average speed over the speed limit during that time. Another illustrative method may be to exclude from the total amount of time the portion where the vehicle is not moving. Then, upon completion of the trip, the route risk value may be calculated and stored in memory along with the other information related to the route risk score and mileage traveled. This information may later be transmitted to an insurance company's data store, as was described above.

In another embodiment in accordance with aspects of the invention, real time data may be used to dynamically assign risk values to each point of risk. For example, some road segments may have a higher risk value when a vehicle travels through at a time when, e.g., snowfall is heavy. In such situations, a dynamic risk value may be applied to the road segment to determine the appropriate route risk value to assign to the route.

Figure 5:
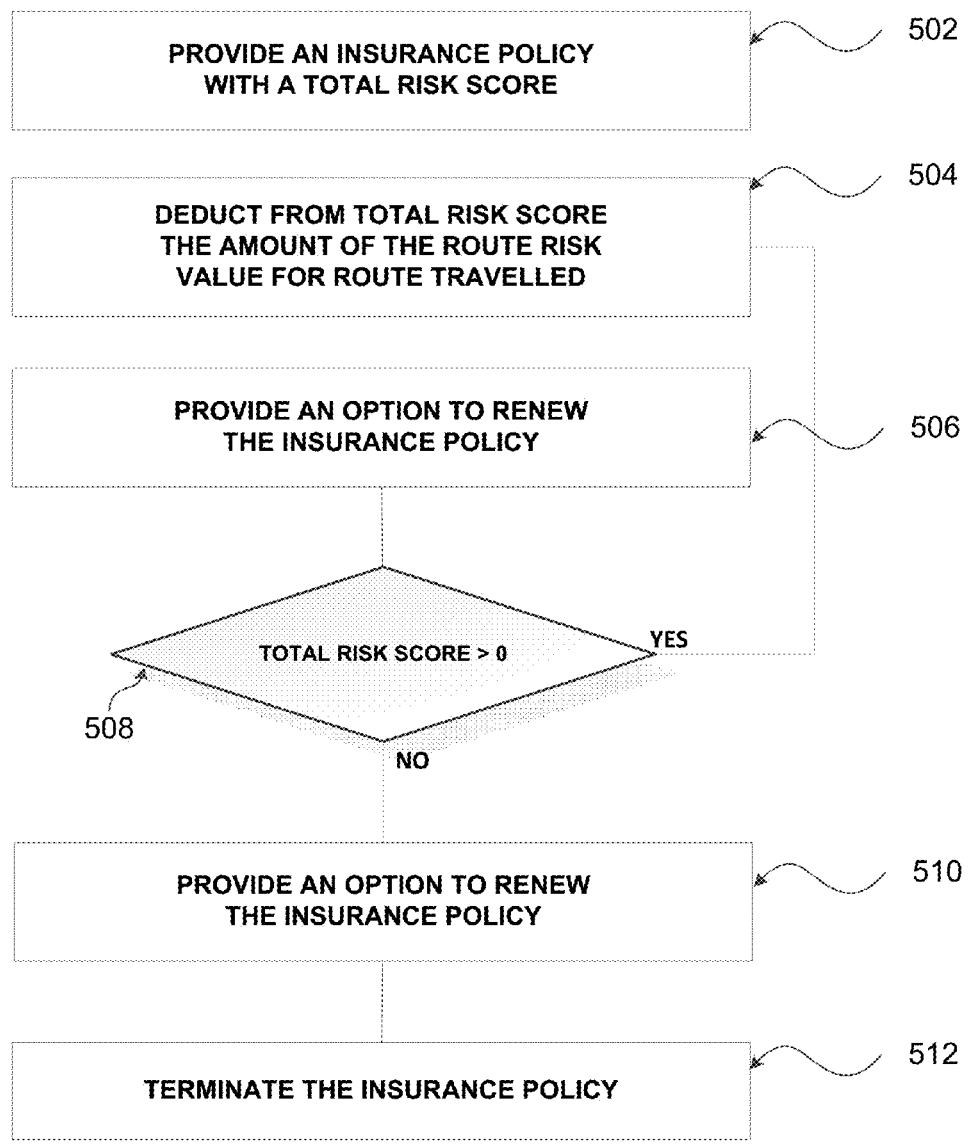
FIG. 5 depicts illustrative steps for providing an insurance policy based on risk consumption in accordance with aspects of the invention.

Referring to FIG. 5, in accordance with aspects of the invention, a method of selling a vehicular insurance policy is illustrated. A vehicle owner or driver may be provided (in step 502) with an insurance policy with a total risk score. The total risk score (e.g., 500) indicates the quantity of risk the vehicle is permitted to travel through before the insurance policy must be renewed or becomes terminated. For example, as the vehicle is driven over various travel routes, the route risk values for the road segments traveled are deducted (in step 504) from the total risk score of the insurance policy. The vehicle owner and/or driver may be provided (in step 506) an option to renew the insurance policy (e.g., to purchase additional risk points to apply towards the total risk score of the insurance policy). Once the total risk score falls to zero or under (see step 508), the vehicle owner and/or driver (or any other person/entity authorized to renew the policy) is provided (in step 510) with a final option to renew the insurance policy before the insurance policy terminates (in step 512). It will be apparent to one skilled in the art after review of the entirety disclosed that the embodiment illustrated above may benefit from a personal navigation device 110 (or similar device) to monitor and record the route traveled by a vehicle. At least one benefit of the insurance policy illustrated by FIG. 5 is the ability to pay per quantity of risk consumed instead of paying only a fixed premium.

In another embodiment in accordance with aspects of the invention, route-dependent pricing uses route risk values to adjust insurance pricing based on where a vehicle is driven. Contrary to the embodiment above where the vehicle's insurance policy terminated dependent on the quantity of risk consumed by the vehicle's travel route, in this embodiment, an insurance company (or its representatives, e.g., agent) may adjust the price quoted/charged for an insurance policy based on risk consumed. In this embodiment, a vehicle/driver may be categorized into a risk class (e.g., low-risk, medium-risk, high risk, etc.) and charged for insurance accordingly. For example, the vehicle/driver may be provided with notification of a credit/debit if the vehicle consumed less/more, respectively, of risk at the end of a policy term than was initially purchased.

In another embodiment: the insurance policy is sold and priced in part based on where a customer falls within a three sigma distribution of risk units consumed by all insured per a typical policy period. The policy pricing may be based on an initial assumption of risk to be consumed in the prospective policy period or may be based on risk consumed in a preceding policy period. In a case where the number of risk units consumed is greater than estimated, the customer may be billed for the overage at the end of (or during) the policy period. In yet another embodiment, the system may be provided as a pay-as-you-drive coverage where the customer is charged in part based on the actual risk units consumed in the billing cycle. The system may include a telematics device that monitors, records, and periodically transmits the consumption of risk units to processor 114 that may automatically bill or deduct the cost from an account.

While the invention has been described with respect to specific examples including presently exemplary modes of carrying out the invention, those skilled in the art will appreciate that there are numerous variations and permutations of the above-described systems and techniques that fall within the spirit and scope of the invention.

Figure 6:
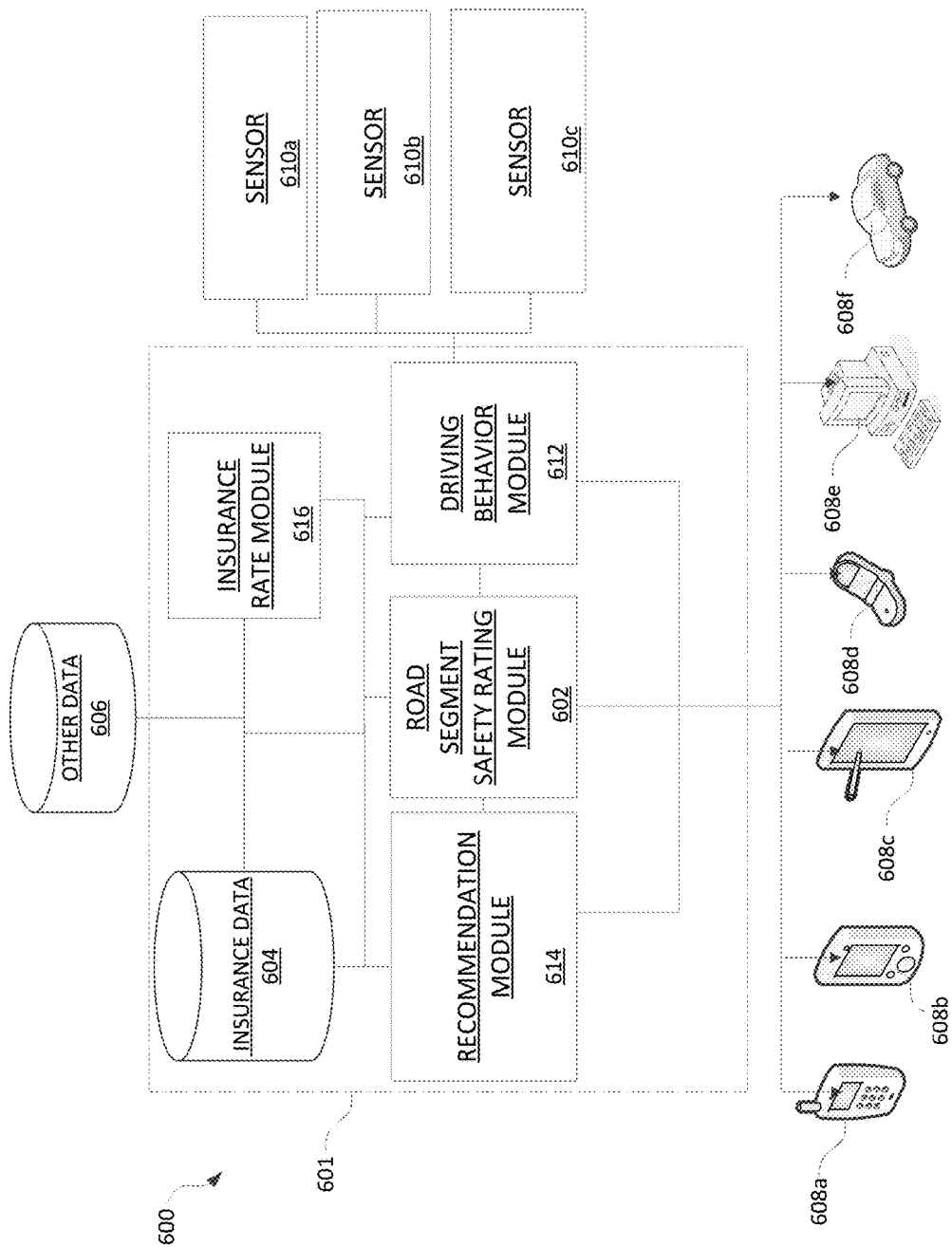
FIG. 6 is an example road segment safety rating system according to one or more aspects described herein.

FIG. 6 is a schematic diagram of an illustrative road segment safety rating system 600. The road segment safety rating system 600 may be associated with, internal to, operated by, or the like, an entity 601, such as an insurance provider. In some examples, the entity may be one of various other types of entities, such as a government entity, corporation or business, university, or the like. Various examples described herein will be discussed in the context of an insurance provider. However, nothing in the specification should be viewed as limiting use of the systems, methods, arrangements, etc. described herein to use only by an insurance provider.

The road segment safety rating system 600 may include one or more modules that may include hardware and/or software configured to perform various functions within the system 600. The one or more modules may be separate, physical devices or, in other examples, one or more modules may be part of the same physical device.

The road segment safety rating system 600 may include a road segment safety rating module 602. The road segment safety rating module 602 may receive data from one or more data stores, such as data stores 604 and 606, and may determine a safety rating for one or more road segments. In some examples, the safety rating of the road segment may correspond to a risk value of the road segment, as described herein. In other examples, the safety rating of the road segment may be a different value determined as described herein. In some examples, a road segment may be some or all of a particular road. As discussed above, the road segments may have varying lengths or distances, may be formed of various materials, may include various types of roads (e.g., highway, country road, etc.), and the like.

As indicated above, at least some of the data used to determine the road segment safety rating may be received from one or more data stores. The data stores may be associated with or internal to the entity 601, such as data store 604, or may be external to the entity 601, such as data store 606. Data that may be used to determine a road segment safety rating may include historical accident information associated with a particular road segment, traffic volume information associated with a particular road segment, severity of accident associated with a particular road segment (e.g., based on previously received insurance claim data), and the like. In some examples, geocoded data may be received by the system 600 (e.g., from data store 606) and may be used to determine a risk value and/or road segment safety rating. In some arrangements, additional information such as type of road segment (2-lane highway, 4-lane highway, rural road, etc.), condition of road segment (e.g., newly resurfaced, severely damaged, etc.), and the like (as discussed above), may be used to determine the road segment safety rating.

Accordingly, some information may be received by the road segment safety rating module 602 from internal data store 604. The internal data store 604 may include information associated with accidents associated with the road segment, accidents associated with that type of road or one or more features of the road segment (e.g., number of bends, merging, etc.), severity of accidents associated with the road segment (e.g., based on insurance claim data), number of accidents associated with the road segment, time of day of accident, date of accident, and the like. Accident information received from internal data store 604 may be collected from historical accident or claim information of the insurance provider entity 601. The internal data store 604 may also include information associated with conditions of the road segment (e.g., pot holes, type of road, etc.). In some arrangements, this information may be received from a telematics device associated with one or more vehicles, and associated sensors detecting such information. The received telematics data may be stored and used to determine, for example, a road segment safety rating.

External data store 606 may provide additional information to the system 600. For instance, external data store may provide additional information associated with the type of road, condition of the road, etc. Further, external data store 606 may include information gathered from various sources regarding accidents associated with the road segment, traffic volume associated with the road segment, and the like. As discussed above, the accident information may be received from a third party and/or coded to identify the road segment, type of accident, severity of accident, and the like. In some examples, external data store 606 may include information associated with environmental or weather conditions surrounding a road segment. Accordingly, a road segment safety rating may be generated in real-time, or near real-time, and may include current weather conditions (e.g., rain, snow, fog, etc.). Some example algorithms that may be used to determine a road segment safety rating are provided below. The example algorithms provided are merely examples and various other algorithms may be used to determine road segment safety rating without departing from the invention.

In some examples, the road segment safety rating may be based on static variables (e.g., variables that do not change rapidly or frequently). For instance, one example algorithm may be:

$$\text{Road safety rating} = \exp(\text{prior accident frequency on the road segment}*W_1 + \text{road curvature}*W_2 + \text{road segment has lane merge}*W_3 + \text{road segment has merge from left}*W_4).$$

$W_1$ though $W_4$ may be weighting factors applied to each variable.

In other examples, the road segment safety rating may be based on a combination of static factors (similar to the equation above) as well as some dynamic road factors (e.g., factors associated with the road segment that may change rapidly or frequently). For instance, $$\text{Road segment safety rating} = \exp(\text{prior accident frequency on the road segment}*W_1 + \text{road curvature}*W_2 + \text{road segment has lane merge}*W_3 + \text{road segment has merge from left}*W_4 + \text{road segment has construction}*W_5 + \text{number of inches of snow on road segment}*W_6 + \text{road segment is wet}*W_7 + \text{traffic factor}*W_8).$$

In this example algorithm, $W_1$ though $W_8$ represent weighting factors and variables such as road segment has construction, number of inches of snow on road segment, road segment is wet, and traffic factor may be dynamic factors used in combination with the static factors described above.

In still other examples, the road segment safety rating may be based on static factors, dynamic factors, as well as one or more driver behavior factors. For instance, $$\text{Road segment safety rating} = \exp(\text{prior accident frequency on the road segment}*W_1 + \text{road curvature}*W_2 + \text{road segment has lane merge}*W_3 + \text{road segment has merge from left}*W_4 + \text{road segment has construction}*W_5 + \text{number of inches of snow on road segment}*W_6 + \text{road segment is wet}*W_7 + \text{traffic factor}*W_8 + (\text{road curvature}*\text{driver takes curves fast}*W_9) + (\text{number of inches of snow}*\text{driver brakes hard}*W_{10})).$$

In this example, $W_1$ through $W_{10}$ are weighting factors and variables such as "driver takes curve fast" and "driver brakes hard" are example driving behaviors that may be used to determine a road segment safety rating particular to a driver.

As indicated above, various other algorithms, various different weighting factors, additional or different variables, etc. may be used without departing from the invention. The above-described algorithms are merely some examples of algorithms that may be used to determine a road segment safety rating and should not be viewed as limiting the invention to only those example algorithms provided.

Accordingly, the road segment safety rating module 602 may detect a location of a vehicle (e.g., via global positioning system (GPS) data collected from the vehicle) and may identify a road segment associated with the location of the vehicle. This identification of the road segment may be performed by comparing the location coordinates from the vehicle to location coordinates of roads obtained, for example, from a mapping company or form analysis of many vehicle's location coordinates over time. The road segment safety rating module 602 may then receive data from various data stores, such as data store 604 and/or data store 606, and may generate a road segment safety rating for the identified road segment. The safety rating may be transmitted to a computing device of a user, such as one or more of computing devices 608*a*-608*f*. For instance, the road segment safety rating may be transmitted to a smart phone 608*a*, personal digital assistance 608*b*, tablet computing device 608*c*, cell phone 608*d*, on-board vehicle computing device 608*f*, or other computing device 608*e*.

In some arrangements, the road segment safety rating may be generated by the road segment safety module 602 based on data associated with the road segment, as discussed above, as well as data associated with a driver of the vehicle. For instance, driver-specific data may be received by the road segment safety rating module 602 and may be used in conjunction with the various types of data discussed above, to determine a road segment safety rating for a particular road segment. For instance, the system 600 may include a plurality of sensors 610. The sensors 610 may be any of various types of sensors, as will be discussed more fully herein. The sensors 610 may be used to obtain data associated with driving behaviors of the user, such as hard braking, speeding, and the like. In another example, one or more sensors may be used to detect environmental conditions such as precipitation, humidity, cloud cover, or the like. In still another example, one or more sensors may be used to determine road conditions or to obtain information from outside sources (e.g., external databases, or the like) regarding traffic conditions, types of road (e.g., two-lane road, four-lane road), speed limit of the road, or the like. The data from one or more sensors 610, which may include data from combinations of different types of sensors, may be transmitted to driving behavior module 612 for analysis.

The driving behavior module 612 may analyze sensor data received from one or more of sensors 610 and may identify one or more driving behaviors of a particular driver or operator of the vehicle. For instance, the driving behavior module 612 may determine whether the user generally drives at a speed over the speed limit, generally follows too closely behind a vehicle in front of him, generally brakes hard, and the like. This information may be transmitted to the road segment safety rating module 602 for use in determining a safety rating for a particular road segment.

For instance, the user data received from the driving behavior module 612 may be combined with data received from the one or more data stores (e.g., 604, 606) to determine a road segment safety rating that is particular to, or unique to, the user or current operator of the vehicle. Accordingly, while a particular road segment may have a first safety rating for driver 1, the road segment may have a second, different safety rating for driver 2, based on the different driving behaviors of driver 1 and driver 2. Thus, any recommendations for alternate routes may account for the type of driving behavior of the current user or operator of the vehicle, as will be discussed more fully herein.

In some arrangements, raw sensor data (e.g., from one or more of sensors 610) may be used in conjunction with other data (e.g., from data store 604, 606) to generate the road segment safety rating. For instance, one or more sensors may be used to detect precipitation. That information may be provided to the road segment safety rating module 602 in real-time, or near real-time, and may be combined with other data (e.g., accident data, traffic volume data, etc.) for the road segment, and/or user driving behavior data, to generate or determine the road segment safety rating for the road segment. In some examples, based on this real-time or near real-time data, any risks identified (e.g., risks appearing along the route being traveled) may be transmitted to the user, via an audible warning or alert to displayed on a computing device, such as an on-board vehicle computing device, mobile device of the user, etc. The risks may be unique to the driver based on driving characteristic data collected for the user, as well as current external or environmental conditions.

Road segment safety rating system 600 may further include a recommendation module 614. The recommendation module 614 may generate, or be configured to generate, one or more recommendations for alternate road segments that may have a safer rating than, for instance, a road segment on which the vehicle is currently travelling or will be travelling. In some examples, historical road segment safety rating data may be stored, for instance, in a data table. Accordingly, upon generating a road segment safety rating (e.g., by the road segment safety rating module 602), the determined safety rating may be transmitted to the recommendation module 614. The recommendation module 614 may evaluate the safety rating to determine whether it is at or above a pre-determined safety threshold. For instance, a system may identify a minimum threshold for road segments to be considered safe. If the determined safety rating is at or above the threshold, the recommendation module 614 may store the rating (e.g., in the data table) for further consideration.

As another example, before the driver starts driving, they may enter their intended destination (or their probable or expected destination could be predicted) into a computing device (e.g., mobile device, on-board vehicle computing device, or the like) which then obtains travel time and risk estimates for a number of potential road segments to be traveled upon. An optimization function may run to determine a path or route from the current location to the destination that minimizes travel time, road risks, and/or combinations thereof. For instance, one example combination of travel time and road risk that may be used may be: 2.1*travel_time+1.4*road_risk. Other considerations may be included in this quantity to be minimized such as toll roads, nice scenery to look at, freeways or lack thereof, etc. Weights on the various variables in the quantity to be minimized could be entered by the user before the trip, or could be determined, such as by a computing device, over time by observing or collecting data from the driver's trips for a predetermined period of time.

If the recommendation module 614 determines that the safety rating is below the pre-determined threshold, the module 614 may identify one or more alternate road segments that may be used in lieu of the current road segment. Identification of alternate road segments may be performed by comparing the current road segment with other road segments in the same or similar geographic area that have a higher safety rating or a safety rating above the threshold. The recommendation(s) may be transmitted to a user, such as via one or more computing devices 608a-608f.

As mentioned above, the recommendation module 614 may also consider driving behaviors of the driver or operator of the vehicle when generating one or more recommendations. For instance, the recommendation module 614 may consider driving behavior data, such as that received from the driving behavior module 612, when identifying alternate road segment. For instance, a driver who is identified as generally driving below the speed limit may be provided with alternate road segments that are lower volume traffic roads, rather than busy highways, in which the user may be able to proceed more slowly without disrupting traffic or causing an accident.

The road segment safety rating system 600 may further include an insurance rate module 616. The insurance rate module 616 may store information associated with various users and insurance policies associated with those users. In some examples, road segment safety rating information may be used to determine an insurance rate for a user. For instance, a history of travelling on higher safety rated road segments may be an indication of less risk associated with insuring the user and, thus, the user may be provided with a lower insurance premium than other users who travel on lower safety rated road segments. In another example, a user who travels on road segments having a high safety rating may be provided with a discount or other insurance incentive for his or her driving behavior. In some arrangements, the system may generate and/or offer to the user (e.g., via computing device 608) one or more discounts or insurance incentives to implement the recommendations provided by the recommendation module 614.

In some example arrangements, a user may have a pay as you drive type of insurance policy. That is, the user may pay for a pool of insurance credit (e.g., units of credit) that may be reduced based on the driving behaviors of the user. Accordingly, in such examples, the insurance credit may be reduced at a faster rate when the driver is travelling on road segments with a lower safety rating than road segments with a higher safety rating.

Although many examples described herein indicate that a higher safety rating is better or safer than a lower safety rating (e.g., on a scale of 1-100, a 100 would be a safer rating than a 1), this is merely one example road segment safety rating arrangement. Various scales and arrangements (e.g., a scale of 1-10 with 10 being the least safe, etc.) may be used without departing from the invention. Also, as discussed above, the road segment safety rating may be the same as, or similar to the risk value discussed above. In other examples, the road segment safety rating may be a different value or may be derived from the risk value discussed above (e.g., 100–determined risk value=road segment safety rating).

The road segment safety rating determined herein may be combined with safety ratings for a plurality of other road segments to establish an overall route or trip safety rating. In these examples, the overall safety rating of a route may be determined and, if the safety rating is below a pre-determined threshold, one or more recommendations for alternate routes may be identified and/or communicated to the user.

Figure 7:
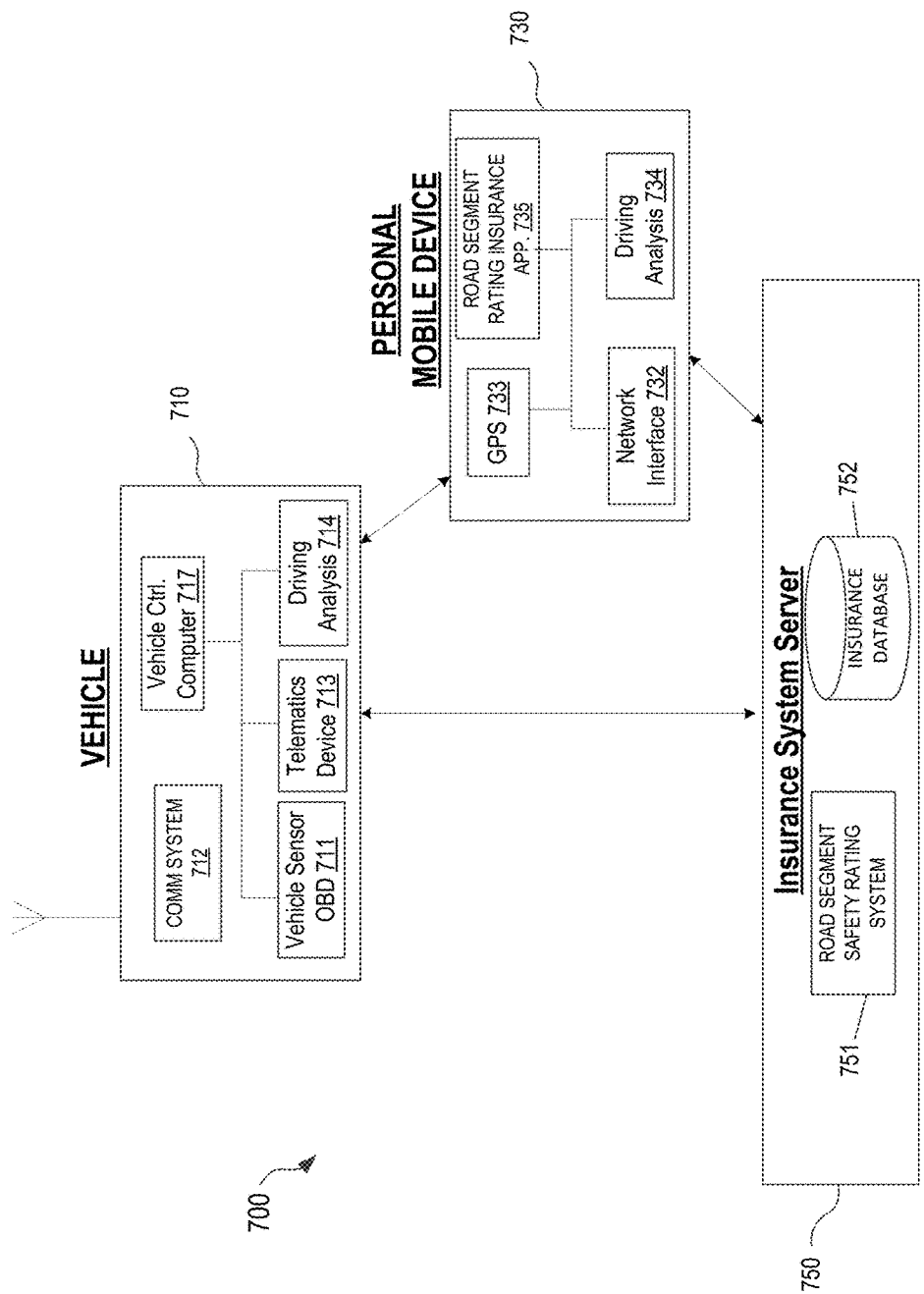
FIG. 7 is an example road segment safety rating system environment illustrating various communications between vehicles-based devices, a personal mobile device, and an insurance system server, according to one or more aspects of the disclosure.

FIG. 7 is a diagram of an illustrative driving analysis system 700 including additional aspects of the road segment safety rating system 700 shown in FIG. 6 and/or implementing the road segment safety rating system 600 of FIG. 6. The system 700 includes a vehicle 710, a personal mobile device 730, an insurance system server 750, and additional related components. As discussed below, the components of the system 700, individually or using communication and collaborative interaction, may determine, present, and implement various types of road segment safety ratings to customers, including generating a road segment safety rating based on road segment data and/or user driving behavior data, determining whether the safety rating is above a pre-determined threshold, identifying alternate road segments, and/or communicating alternate road segments to a user, etc. To perform such features, the components shown in FIG. 7 each may be implemented in hardware, software, or a combination of the two. Additionally, each component of the system 700 may include a computing device (or system) having some or all of the structural components described herein for computing device 102 in FIG. 1 and/or computing device 1301 in FIG. 13.

Vehicle 710 in the system 700 may be, for example, an automobile, a motorcycle, a scooter, a bus, a recreational vehicle, a boat, or other vehicle for which vehicle data, location data, driver data (or operator data), operational data and/or other driving data (e.g., location data, time data, weather data, etc.) may be collected and analyzed. The vehicle 710 includes vehicle operation sensor 711 (similar to one or more of sensors 610a-610c of FIG. 6) capable of detecting and recording various conditions at the vehicle and operational parameters of the vehicle. For example, sensor 711 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensor 711 also may detect and store data received from the vehicle's 710 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems (OBD).

Additional sensors 711 may detect and store the external driving conditions, for example, external temperature, rain, snow, light levels, and sun position for driver visibility. For example, external cameras and proximity sensors 711 may detect other nearby vehicles, vehicle spacing, traffic levels, road conditions, traffic obstructions, animals, cyclists, pedestrians, and other conditions that may factor into a driving data/behavior analysis. Sensor 711 also may detect and store data relating to moving violations and the observance of traffic signals and signs by the vehicle 710. Additional sensors 711 may detect and store data relating to the maintenance of the vehicle 710, such as the engine status, oil level, engine coolant temperature, odometer reading, the level of fuel in the fuel tank, engine revolutions per minute (RPMs), software upgrades, and/or tire pressure.

Vehicle sensor 711 also may include cameras and/or proximity sensors capable of recording additional conditions inside or outside of the vehicle 710. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensor 711 also may be configured to collect data identifying a current driver from among a number of different possible drivers, for example, based on driver's seat and mirror positioning, driving times and routes, radio usage, etc. Voice/sound data along with directional data also may be used to determine a seating position within a vehicle 710. Sensor 711 also may be configured to collect data relating to a driver's movements or the condition of a driver. For example, vehicle 710 may include sensors that monitor a driver's movements, such as the driver's eye position and/or head position, etc. Additional sensors 711 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer, along with other biometric sensors.

Certain vehicle sensors 711 also may collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors and/or cameras 711 may determine when and how often the vehicle 710 stays in a single lane or strays into other lane. A Global Positioning System (GPS), locational sensors positioned inside the vehicle 710, and/or locational sensors or devices external to the vehicle 710 may be used to determine the route, speed, lane position, road-type (e.g. highway, entrance/exit ramp, residential area, etc.) and other vehicle position/location data.

The data collected by vehicle sensor 711 may be stored and/or analyzed within the vehicle 710, such as for example a driving analysis computer 714 integrated into the vehicle, and/or may be transmitted to one or more external devices. For example, as shown in FIG. 7, sensor data may be transmitted via short-range communication systems 712 or other communication networks (e.g., WAN or cellular networks) to other nearby vehicles. Additionally, the sensor data may be transmitted via a telematics device 713 to one or more remote computing devices, such as personal mobile device 730, insurance system server 750, and/or other remote devices.

Short-range communication system 712 is a vehicle-based data transmission system configured to transmit vehicle operational data to other nearby vehicles or infrastructure, and to receive vehicle operational data from other nearby vehicles. In some examples, communication system 712 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication system 712 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between short-range communication system 712 and other systems may be sent via DSRC, Bluetooth, satellite, GSM infrared, IEEE 802.11, WiMAX, RFID, and/or any suitable wireless communication media, standards, and protocols. In certain systems, short-range communication system 712 may include specialized hardware installed in vehicles 710 (e.g., transceivers, antennas, etc.), while in other examples the communication system 712 may be implemented using existing vehicle hardware components (e.g., radio and satellite equipment, navigation computers) or may be implemented by software running on the mobile device 730 of a driver and/or passengers within the vehicle 710.

V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 710 to any other vehicle, or other infrastructure device capable of receiving the communication, within the range of the vehicle's transmission capabilities. The range of V2V communications and V2I communications may depend on the wireless communication standards and protocols used, the transmission/reception hardware (e.g., transceivers, power sources, antennas), and other factors. Short-range V2V (and V2I) communications may range from just a few feet to many miles, and different types of driving behaviors may be determined depending on the range of the V2V communications. For example, V2V communications ranging only a few feet may be sufficient for a driving analysis computing device 714 in one vehicle to determine that another vehicle is tailgating or cut-off the vehicle, whereas longer communications may allow the device 714 to determine additional types of driving behaviors (e.g., vehicle spacing, yielding, defensive avoidance, proper response to a safety hazard, etc.) and driving conditions (e.g., traffic, road conditions, weather conditions, etc.).

The types of vehicle operational data, or vehicle driving data, transmitted by vehicle 710 may depend on the protocols and standards used for the V2V and V2I communication, the range of communications, the autonomous driving system, and other factors. In certain examples, vehicles 710 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 710 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as detection by the vehicle's 710 internal systems that the vehicle is skidding, that an impact has occurred, or that the vehicle's airbags have been deployed, also may be transmitted in V2V communications.

As shown in FIG. 7, the data collected by vehicle sensor 711 may be transmitted to an insurance system server 750, personal mobile device 730, and/or additional external servers and devices via telematics device 713. Telematics device 713 may be one or more computing devices containing many or all of the hardware/software components as the computing device 1301 depicted in FIG. 13. As discussed above, the telematics device 713 may receive vehicle operation data and driving data from vehicle sensor 711, and may transmit the data to one or more external computer systems (e.g., insurance system server 750 of an insurance company, financial institution, or other entity) over a wireless transmission network. Telematics device 713 also may be configured to detect or determine additional types of data relating to real-time driving and the condition of the vehicle 710. The telematics device 713 also may store the type of vehicle 710, for example, the make, model, trim (or submodel), year, and/or engine specifications, autonomous driving system specifications, as well as other information such as vehicle owner or driver information, insurance information, and financing information for the vehicle 710.

In the example shown in FIG. 7, telematics device 713 may receive vehicle driving data from vehicle sensor 711, and may transmit the data to an insurance system server 750. However, in other examples, one or more of the vehicle sensors 711 or systems may be configured to receive and transmit data directly from or to an insurance system server 750 without using a telematics device. For instance, telematics device 713 may be configured to receive and transmit data from certain vehicle sensors 711 or systems, while other sensors or systems may be configured to directly receive and/or transmit data to an insurance system server 750 without using the telematics device 713. Thus, telematics device 713 may be optional in certain embodiments.

In certain embodiments, vehicle sensors, vehicle on-board diagnostic systems (OBDs) and other vehicle-based systems and/or vehicle communication systems, may collect and/or transmit data pertaining to autonomous driving of the vehicles. In autonomous driving, the vehicle fulfills all or part of the driving without being piloted by a human. An autonomous car can be also referred to as a driverless car, self-driving car, or robot car. For example, in autonomous driving, a vehicle control computer 717 may be configured to operate all or some aspects of the vehicle driving, including but not limited to acceleration, braking, steering, and/or route navigation. A vehicle with an autonomous driving capability may sense its surroundings using the vehicle sensor 711 and/or receive inputs regarding control of the vehicle from the vehicle communications systems, including but not limited to short range communication system 712 telematics device 713, or other vehicle communication systems.

The system 700 in FIG. 7 also includes a mobile device 730. Mobile device 730 may be, for example, a smartphone or other mobile phone, personal digital assistant (PDA), tablet computer, and the like, and may include some or all of the elements described herein with respect to the computing device 1301 in FIG. 13. As shown in this example, some mobile devices in systems 700 (e.g., mobile device 730) may be configured to establish communication sessions with vehicle-based devices and various internal components of vehicle 710 via wireless networks or wired connections (e.g., for docked devices), whereby such mobile device 730 may have secure access to internal vehicle sensors 711 and other vehicle-based systems. However, in other examples, the mobile device 730 might not connect to vehicle-based computing devices and internal components, but may operate independently by communicating with vehicle 710 via their standard communication interfaces (e.g., telematics device 713, etc.), or might not connect at all to vehicle 710.

Mobile device 730 may include a network interface 732, which may include various network interface hardware (e.g., adapters, modems, wireless transceivers, etc.) and software components to enable mobile device 730 to communicate with insurance system server 750, vehicle 710, and various other external computing devices. One or more specialized software applications, such as a driving analysis application 734 and/or a road segment safety rating application 735 may be stored in the memory of the mobile device 730. The driving analysis application 734 and road segment safety rating application 735 may be received via network interface 732 from the insurance server 750, vehicle 710, or other application providers (e.g., application stores). As discussed below, the driving analysis application 734 and road segment safety rating application 735 may or may not include various user interface screens, and may be configured to run as user-initiated applications or as background applications. The memory of the mobile device 730 also may include databases configured to receive and store vehicle data, driving data, driving trip data, and the like, associated with one or more drivers and/or vehicles.

Like the vehicle-based computing devices in vehicle 710, mobile device 730 also may include various components configured to generate and/or receive vehicle data, driver data, and driving data or other operational data. For example, using data from the GPS receiver 733, a driving analysis software application 734 may be able to identify starting and stopping points of driving trips, determine driving speeds, times, routes, road segments, and the like. Additional components of mobile device 730 may be used to generate or receive driving data for the driving data analysis application 734 and/or road segment safety rating application 735, such as an accelerometer, compass, and various cameras and proximity sensors. As discussed below, these and other mobile device components may be used to receive, store, and output various user/driver data, to identify starting and stopping points and other characteristics of driving trips, identify road segments, to determine various driving data such as speeds, driving routes and times, acceleration, braking, and turning data, and other driving conditions and behaviors. In some implementations, the driving analysis software application 734 may store and analyze the data from various mobile device components, and the road segment safety rating application 735 may use this data, alone or in any combination with other components or devices (e.g., insurance server 750), to determine and present road segment safety ratings, recommended alternate road segments, insurance costs or incentives, and the like.

When mobile computing devices within vehicles are used to detect vehicle driving data and/or to receive vehicle driving data from vehicle sensors, such mobile computing devices 730 may store, analyze, and/or transmit the vehicle driver data (e.g., data identifying a current driver), driving data (e.g., speed data, acceleration, braking, and turning data, and any other vehicle sensor or operational data), and driving trip data (e.g., road segment, driving route, driving times, driving destinations, etc.), to one or more other devices. For example, mobile computing device 730 may transmit driver data, driving data and driving behaviors, and driving trip data directly to one or more insurance servers 750, and thus may be used in conjunction with or instead of telematics devices 713. Additionally, mobile computing device 730 may be configured to perform the V2V and V2I communications described above, by establishing connections and transmitting/receiving vehicle driving data to and from other nearby vehicles. Thus, mobile computing device 730 may be used in conjunction with, or instead of, short-range communication system 712 in some examples. In addition, mobile computing device 730 may be used in conjunction with the vehicle control computers 717 for purposes of autonomous driving. Moreover, the processing components of the mobile computing device 730 may be used to identify vehicle drivers and passengers, analyze vehicle driving data, analyze driving trips, and perform other related functions. Therefore, in certain embodiments, mobile computing device 730 may be used in conjunction with, or in place of, the insurance system server 750.

Vehicle 710 may include driving analysis computer 714, which may be separate computing devices or may be integrated into one or more other components within the vehicle 710, such as the telematics device 713, autonomous driving systems, or the internal computing systems of vehicle 710. As discussed above, driving analysis computers 714 also may be implemented by computing devices independent from the vehicle 710, such as mobile computing device 730 of the drivers or passengers, or one or more separate computer systems (e.g., a user's home or office computer). In any of these examples, the driving analysis computer 714 may contain some or all of the hardware/software components as the computing device 1301 depicted in FIG. 13. Further, in certain implementations, the functionality of the driving analysis computers, such as storing and analyzing driver data, vehicle data, driving data and driving behaviors, and determining, presenting, and implementing aspects of road segment safety rating, may be performed in a central insurance system server 750 rather than by the individual vehicle 710 or personal mobile device 730. In such implementations, the vehicle 710 and and/or mobile device 730, might only collect and transmit driver data, vehicle data, driving data, and the like to an insurance server 750, and thus the vehicle-based driving analysis computer 714 may be optional.

Figure 13:
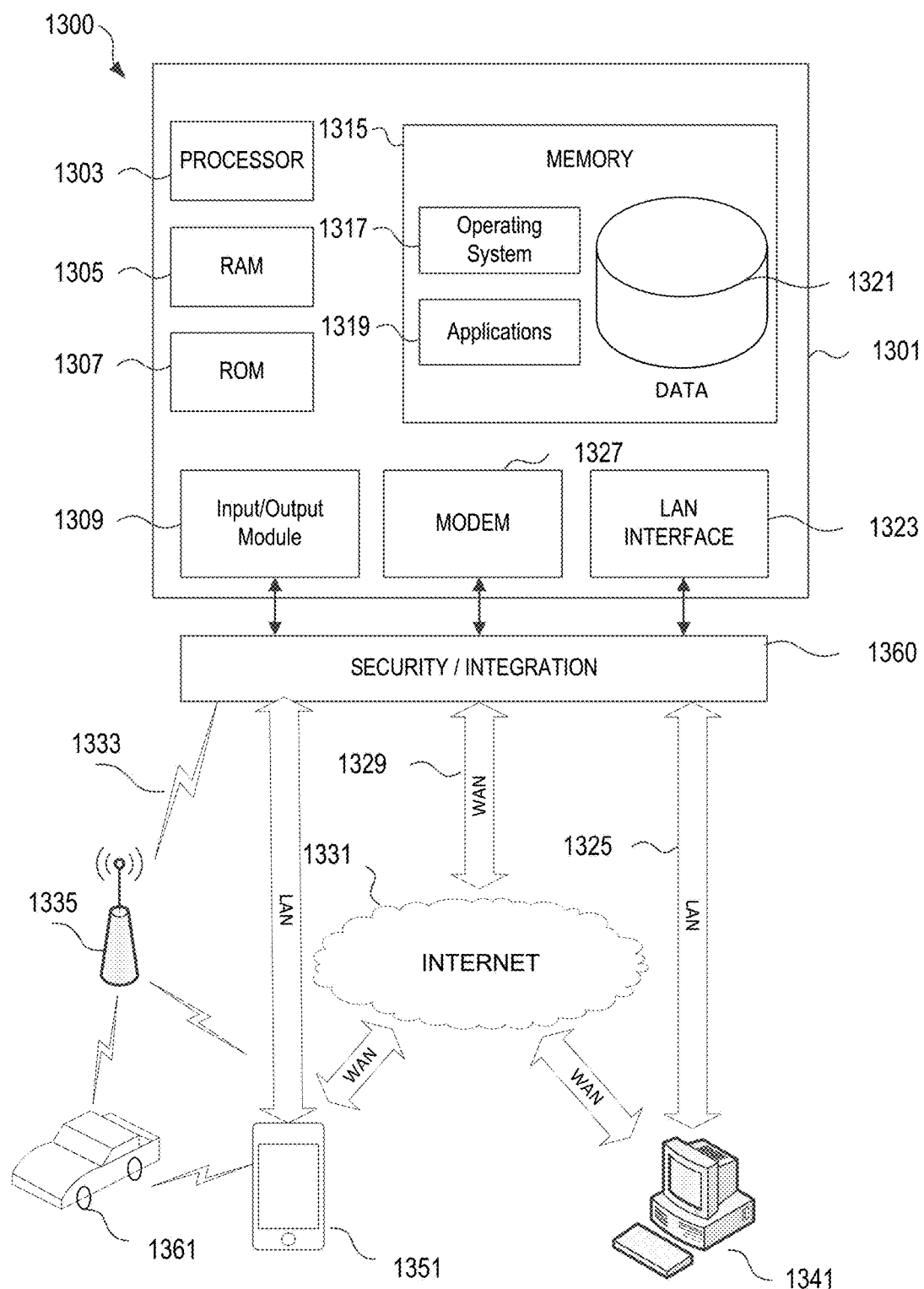
FIG. 13 illustrates computing systems and a network environment that may be used to implement aspects of the disclosure.

The system 700 also may include one or more insurance system servers 750, containing some or all of the hardware/software components as the computing device 1301 depicted in FIG. 13. The insurance system server 750 may include hardware, software, and network components to receive driver data, vehicle data, and vehicle operational data/driving data from one or more vehicles 710, mobile devices 730, and other data sources. The insurance system server 750 may include an insurance database 752 and road segment safety rating system 751 to respectively store and analyze driver data, vehicle data, and driving data, etc., received from vehicle 710, mobile device 730, and other data sources. In some examples, the road segment safety rating system 751 may include many or all of the components of road segment safety rating system 600 described with respect to FIG. 6.

The insurance system server 750 may initiate communication with and/or retrieve driver data, vehicle data, and driving data from vehicle 710 wirelessly via telematics device 713, mobile device 730, or by way of separate computing systems over one or more computer networks (e.g., the Internet). Additionally, the insurance system server 750 may receive additional data from other third-party data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), route and navigation information, and insurance company databases containing insurance data (e.g., driver score, coverage amount, deductible amount, premium amount, insured status) for the vehicle, driver, and/or other nearby vehicles and drivers.

Data stored in the insurance database 752 may be organized in any of several different manners. For example, a driver table in database 752 may contain all of the driver data for drivers associated with the insurance provider (e.g., driver personal information, insurance account information, demographic information, accident histories, risk factors, driving scores and driving logs, etc.), a vehicle table may contain all of the vehicle data for vehicles associated with the insurance provider (e.g., vehicle identifiers, makes, models, years, accident histories, maintenance histories, travel logs, estimated repair costs and overall values, etc.), and a driving trip table may store all of the driving trip data for drivers and vehicles associated with the insurance provider (e.g., road segment identification, road segment safety rating, driving trip driver, vehicle driven, trip time, starting and ending points, route driven, etc.). Other tables in the database 752 may store additional data, including data types discussed above (e.g. traffic information, road-type and road condition information, weather data, insurance policy data, etc.). Additionally, one or more other databases of other insurance providers containing additional driver data and vehicle data may be accessed to retrieve such additional data.

The road segment safety rating system 751 within the insurance system server 750 may be configured to retrieve data from the database 752, or may receive driver data, vehicle data, and driving trip directly from vehicle 710, mobile device 730, or other data sources, and may perform driving data analyses, determine or generate road segment safety ratings, and other related functions. The functions performed by the road segment safety rating system 751 may be performed by specialized hardware and/or software separate from the additional functionality of the insurance system server 750. Such functions may be similar to those of driving analysis module 714 of vehicle 710, and the driving analysis and road segment safety rating applications 734 and 735 of mobile device 730, and further descriptions and examples of the algorithms, functions, and analyses that may be executed by the road segment safety rating system 751 are described below, including in reference to FIGS. 8-12B.

In various examples, the driving data and driving trip analyses and/or road segment safety determinations may be performed entirely in the insurance system server 750, may be performed entirely in the vehicle-based driving analysis computing module 714, or may be performed entirely in the driving analysis and road segment safety rating applications 734 and 735 of mobile device 730. In other examples, certain analyses of driver data, vehicle data, and driving trip data, and certain road segment safety rating determinations may be performed by vehicle-based devices (e.g., within driving analysis module 714) or mobile device 730 (e.g., within applications 734 and 735), while other data analyses and road segment safety rating determinations are performed by the road segment safety rating system 751 at the insurance system server 750. For example, a vehicle-based driving analysis computer 714, or the hardware and software components of mobile device 730 may continuously receive and analyze driver data, vehicle data, driving trip data, and the like to determine certain events and characteristics (e.g., commencement of a driving trip, identification of a driver, determination of a driving route, road segment, or intended destination, driving data and behaviors during driving trips, etc.), so that large amounts of data need not be transmitted to the insurance system server 750. However, for example, after driver, vehicle, and/or driving trip is determined by a vehicle-based device and/or mobile device, corresponding information may be transmitted to the insurance server 750 to perform alternate road segment recommendation determinations, insurance offer and cost determinations, etc. which may be transmitted back to the vehicle-based device and/or personal mobile devices.

Figure 8:
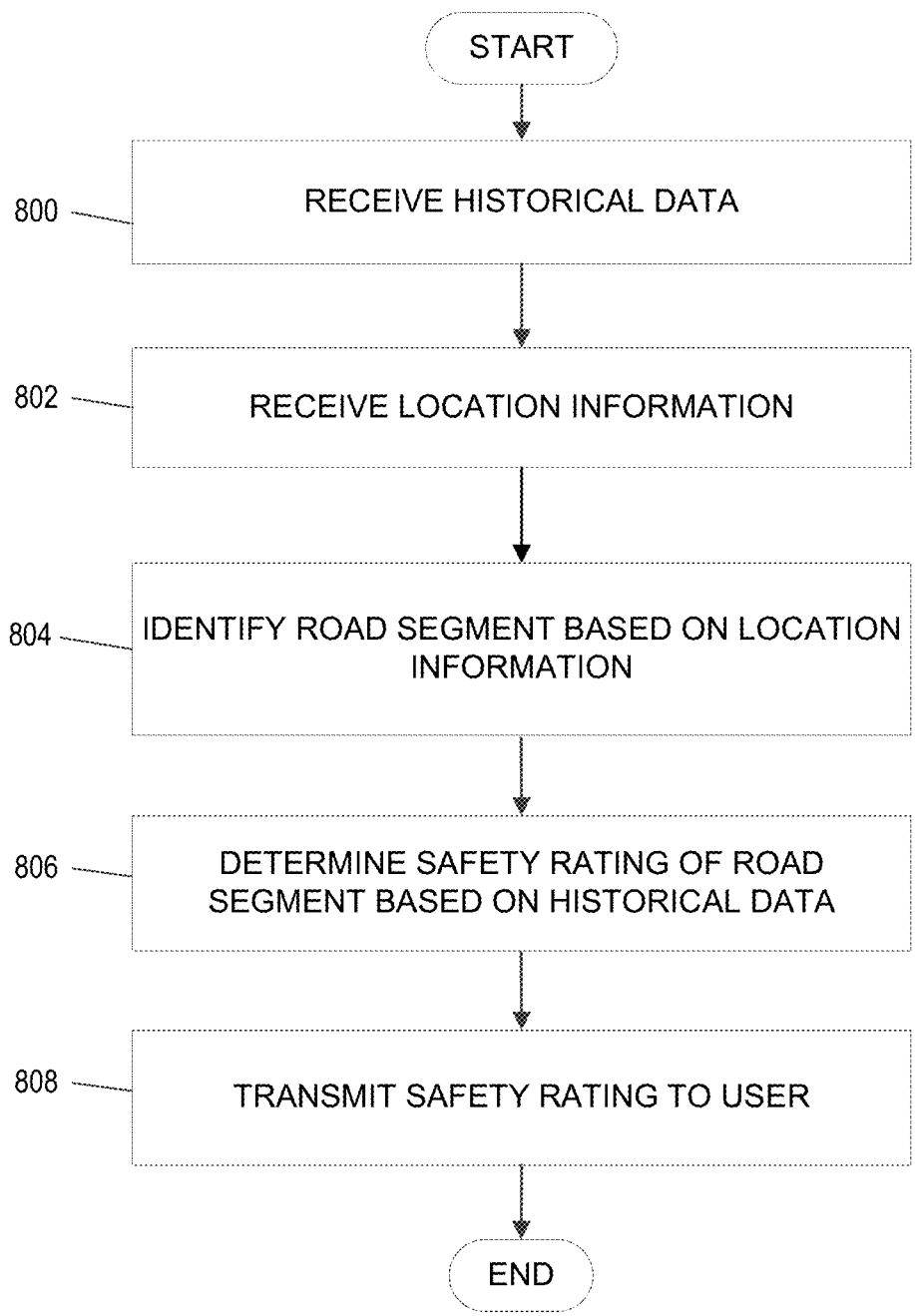
FIG. 8 is a flow diagram illustrating an example method of determining a road segment safety rating according to one or more aspects described herein.

FIG. 8 is a flow chart illustrating one example method of determining a road segment safety rating, according to one or more aspects described herein. In step 800, historical data is received by the system. As discussed above, the historical data may include data from multiple sources that are either (or both) internal to and external to the entity implanting the system. The historical data may include traffic volume data, accident data, severity of accidents, type of road on which accidents occurred, road type, and the like. The historical data may further include information associated with various road conditions, features, etc. For example, historical data may include information such as bends in a road or road segment, lane mergers or changes in a road or road segment, cloverleaf interchanges, speed limit of the road or road segment, average speed in relation to speed limit, angle of the sun, time of day, condition of road (e.g., potholes, etc.), curvature of the road, degree of bank on the road, whether pedestrians may be present on or near the road, neighborhood crime statistics, whether the road or road segment is in a residential or commercial area, the season of the year, whether one or more congestion causing events may occur, etc. This data may be received from a variety of sources providing information associated with a plurality of roads and road segments and may be used, as discussed herein, to determine road segment safety ratings for a plurality of road segments. Various other types of data (e.g., historical and real-time or near real-time may also be received and used herein without departing from the invention.

In step 802, location information for a vehicle may be received. In some examples, the location information may be received from a GPS device or system associated with the vehicle. Based on the received location information, a current road segment of the vehicle may be determined in step 804.

In step 806, a road segment safety rating of the road segment identified or determined in step 804 may be generated. As discussed above, the road segment safety rating may be based on the data received (e.g., in step 802) and may be indicative of a safety level of the road segment, as determined from historical driving data associated with that road segment. In step 808, the determined road segment safety rating may be transmitted to the user, e.g., via one or more computing device. For instance, the road segment safety rating may be transmitted to the user via a mobile device of the user and/or an on-board vehicle computing device.

Figure 9:
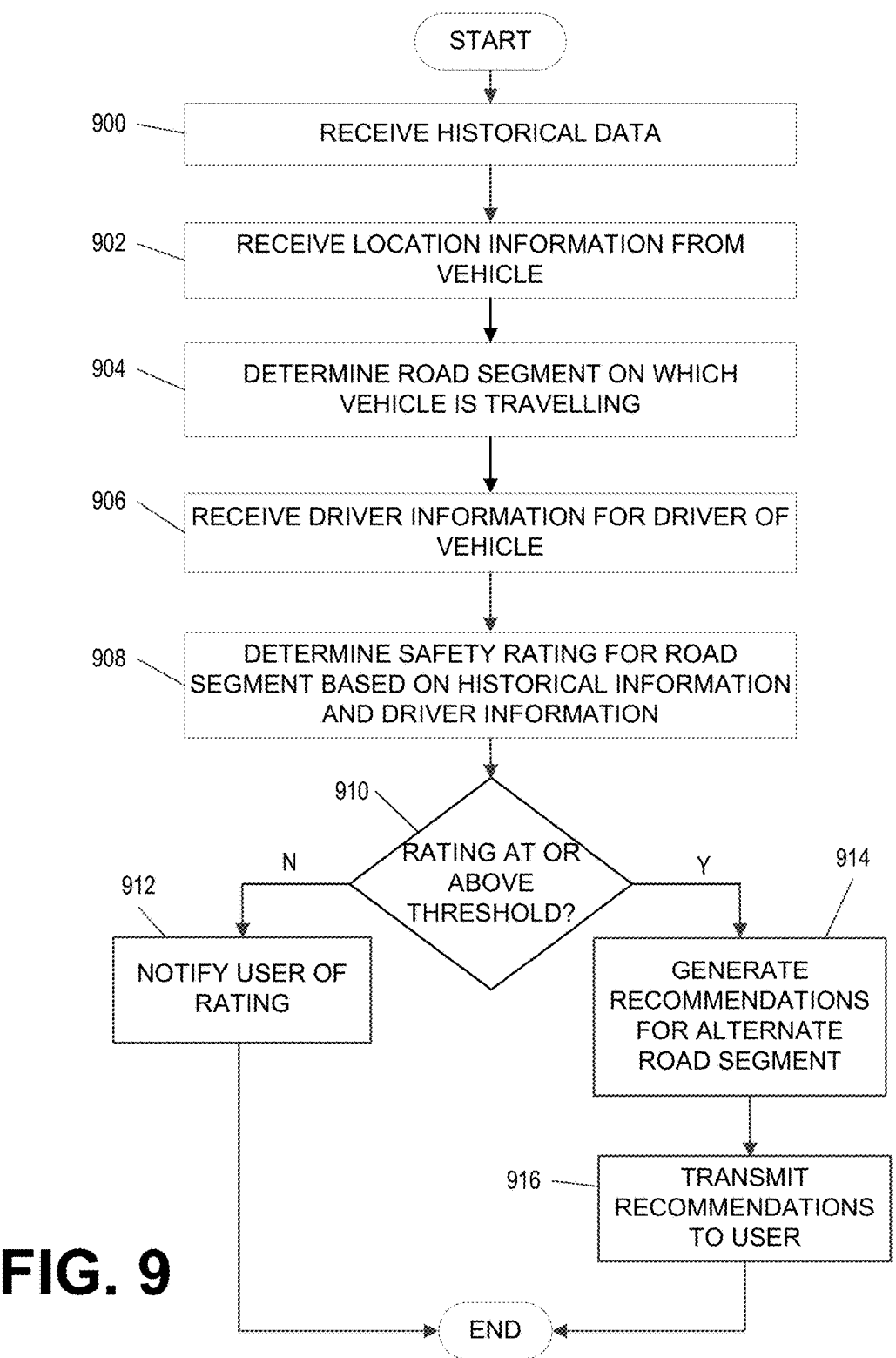
FIG. 9 is another flow diagram illustrating an example method of determining a road segment safety rating according to one or more aspects described herein.

FIG. 9 illustrates another example method of determining a road segment safety rating according to one or more aspects described herein. In step 900, historical information may be received. Similar to step 800, the historical information may be received from one or more sources and may include various types of information associated with one or more roads or road segments, traffic, and the like. In step 902, location information may be received from a vehicle. Similar to step 802, the location information may be received from a GPS system associated with the vehicle.

In step 904, a road segment on which the vehicle is travelling may be identified based on the received location information. In step 906, driver-specific information may be received. As discussed above, the driver-specific information may include driver behaviors determined from data collected from one or more sensors associated with a vehicle. The driving behaviors may be determined over a period of time (e.g., one month, one year, multiple years, etc.). In some examples, the driver-specific information received may be raw sensor data received from one or more sensors associated with the vehicle. For instance, the data may be real-time or near real-time driving data indicative of weather conditions, road conditions, or the like.

In step 908, a safety rating for the identified road segment may be determined based on the received historical information and the received driver-specific information. Accordingly, in such examples, the safety rating determined in step 908 may be particular or unique to the driver, because it relies on driving behaviors of the driver to determine the rating. Thus, any given road segment may have a different safety rating for various different drivers based on the driving behavior information used to determine the road segment safety rating.

In step 910, a determination may be made as to whether the determined road segment safety rating is at or above a predetermined threshold. If so, a notification may be transmitted to the user or driver in step 912 indicating the road segment safety rating. As discussed above, the notification may be transmitted to one or more computing devices of the user, such as a mobile device of the user, on-board vehicle computing device, or the like.

If, in step 910, it is determined that the road segment safety rating is below the predetermined threshold, one or more recommendations for alternate road segments may be generated in step 914. As discussed above, the recommendations may be generated based on a comparison between the road segment and other road segments in a similar geographic location. In some examples, for instance when a user has indicated a destination of the trip, the system may generate an alternate route to the destination that includes road segments having safer ratings than the current road segment or current route. These determinations may be performed by one or more computing devices within the system and may process vast amounts of data associated with road segments, potential routes, road segment safety ratings, and the like, that would be difficult or impossible to be determined by a person without the aid of a computing device.

In some examples, the recommendations generated may be based, at least in part, on driving behaviors of the user. For instance, behaviors such as speed relative to the speed limit, speed relative to other drivers, braking distance, following distance, and the like, that have been determined, such as by a driving behaviors module based on received sensor data, may be used to identify road segments that would be suited to the driving behaviors of the user and may have a safer rating.

In step 916, the one or more recommendations may be transmitted to the user. Similar to the transmission of the road segment safety rating in step 912, the recommendations may be transmitted to a computing device of the user, such as a mobile device or on-board vehicle computing device of the user's vehicle.

Figure 10A:
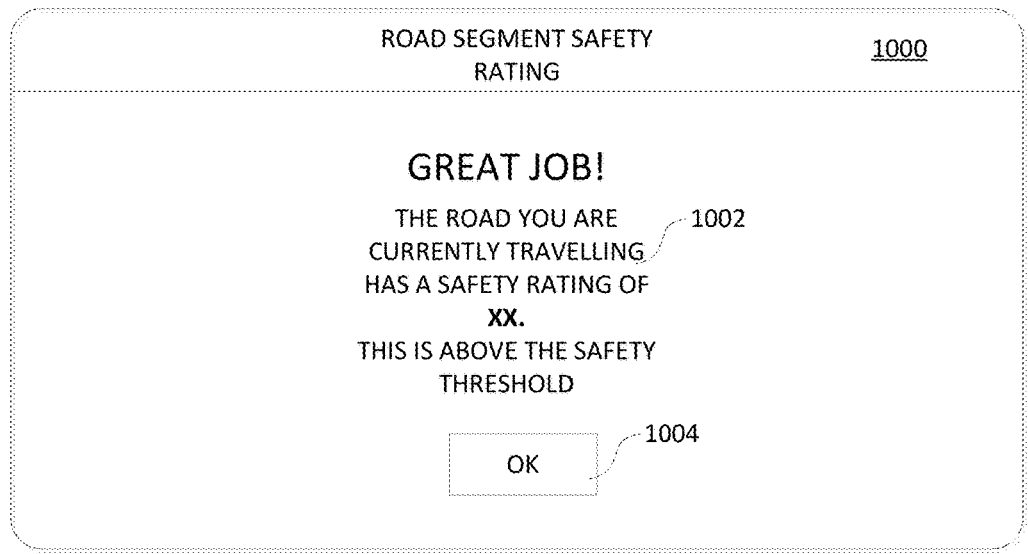
FIGS. 10A and 10B are example user interfaces that may be used to notify a user of a road segment safety rating and/or potential alternate road segments, according to one or more aspects described herein.
Figure 10B:
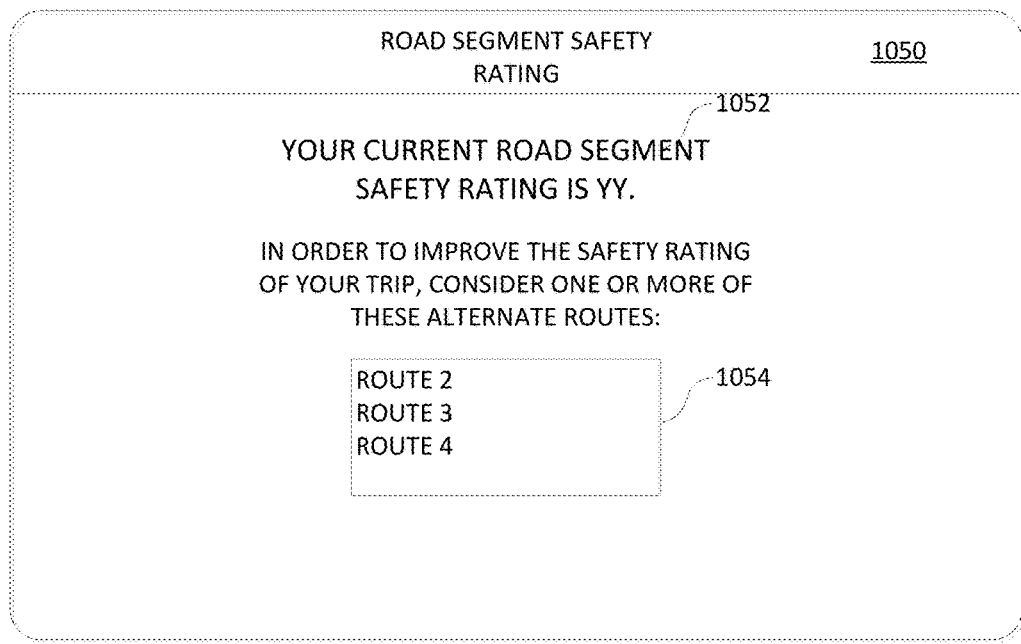

FIGS. 10A and 10B are example user interfaces illustrating notifications that may be transmitted to the user based on the determined road segment safety rating. FIG. 10A includes user interface 1000 that may be presented to a user upon determining that the road segment safety rating is at or above the predetermined threshold. The interface 1000 may be provided to the user via a computing device, such as a mobile device of the user and/or a display of an on-board vehicle computing device. The interface includes region 1002 in which the road segment safety rating is provided to the user. The interface 1000 includes "OK" option 1004. Selection of option 1004 may cause the display to return to a previous screen (e.g., a navigation screen, an audio selection screen, etc.). Additionally or alternatively, the interface 600 may be displayed for a predetermined time period and then the display may automatically revert back to the previous screen. For instance, the road segment safety rating may be displayed for, for example, 10 seconds, 15 seconds, or the like, and then the display may automatically revert back to the screen displayed prior to displaying the road segment safety rating. In some examples, an audible warning may also be provided to the user. For instance, a spoken alert or other audible warning may be provided either in addition to or in lieu of the displayed warning.

FIG. 10B illustrates example user interface 1050. Interface 1050 may be displayed upon determining that the road segment safety rating for the current road segment is below the predetermined threshold. Interface 1050 includes region 1052 in which the current road segment safety rating is provided to the user. In addition, interface 1050 further includes region 1054 in which one or more alternate routes or roads are provided to the user. The user may select one of the options provided and the system may automatically generate navigation directions (or turn-by-turn directions) to transition to the selected route.

The interfaces shown in FIGS. 10A and 10B are merely some example interfaces that may be used to provide road segment safety rating information to a user. Various other interfaces, interface arrangements, and information may be provided to the user without departing from the invention.

Figure 11:
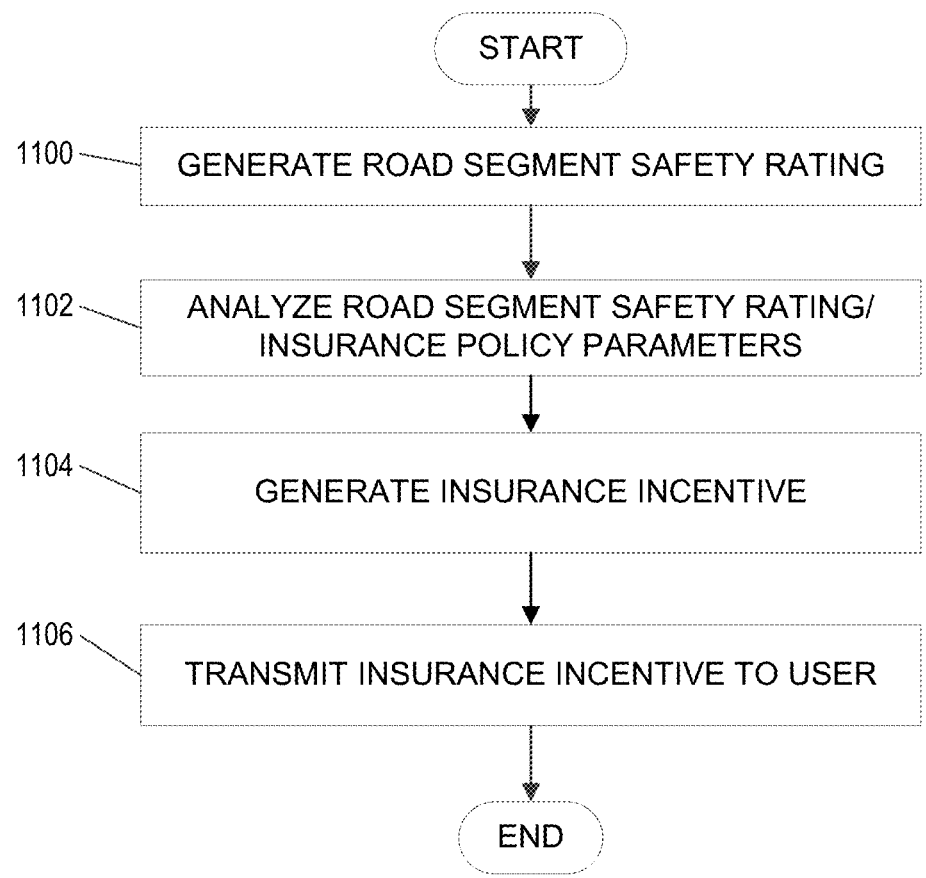
FIG. 11 is a flow diagram illustrating one example method of identifying insurance premiums or incentives based on the determined road segment safety ratings, according to one or more aspects described herein.

FIG. 11 is one example method of identifying insurance premiums or incentives based on the determined road segment safety ratings, according to one or more aspects described herein. In step 1100, a road segment safety rating may be determined. The road segment safety rating may be determined using one or more of the processes described herein and, in particular, in connection with FIGS. 8 and 9.

In step 1102, the road segment safety rating may be analyzed along with one or more insurance policy parameters of an auto insurance policy of the user or vehicle. For instance, a history of high safety road segments traveled by the user or vehicle may result in an option for a reduction in insurance premium, offer of a discount on a premium, or the like. In another example, if the insurance policy is a pay as you drive type of policy, the road segment safety rating may be used to determine a rate at which the credits within the insurance policy are reduced. For instance, as the vehicle travels a route, the safety rating of the road segments traveled may be determined, as discussed herein. Accordingly, the system may determine a rate at which to reduce the insurance credits associated with this trip based at least in part on the road segment safety ratings of one or more road segments traveled. That is, travelling along road segments having a safer rating may result in a lower consumption rate of insurance credits (e.g., credits will last longer, thereby saving the user money associated with purchase of the policy, credits, etc.) than travelling along road segments having a less safe rating, as determined by the system. This may provide the user with an incentive to travel on roads or road segments having safer ratings.

In step 1104, one or more insurance incentives to offer to the user may be generated. Insurance incentives may include a lower premium, a discount on a premium, an amount of cash reward, or the like. In step 1106, the insurance incentive may be transmitted to the user. For instance, the generated one or more incentives may be transmitted to a computing device of a user and displayed therein.

Figure 12A:
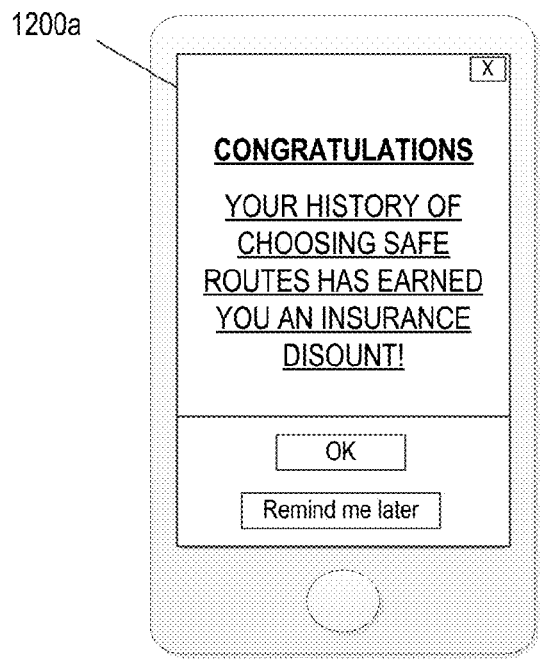
FIGS. 12A and 12B are example user interfaces for notifying a user of an identified insurance incentive, according to one or more aspects described herein.
Figure 12B:

FIGS. 12A and 12B illustrate example user interfaces that may be provided to a user to identify one or more insurance incentives according to one or more aspects described herein. FIG. 12A includes interface 1200a in which the user is notified that his or her safe driving (e.g., selection of road segments having a good safety rating) has earned him or her an insurance discount. Similar to various other notifications described herein, the notification may be transmitted to a computing device of the user, such as a mobile device, on-board vehicle computing device display, or the like. The notification may also be in audible notification projected from the computing device. Upon receiving the notification, the user may elect to move forward with processing the insurance incentive by selecting "OK" option, or may request that the system send a reminder notification at a later time. In some examples, upon selection of "Remind me later" option, the system may automatically transmit a reminder notification at preset times or intervals (e.g., 1 hour later, 24 hours later, 3 days later, etc.).

Selection of "OK" option from interface 1200a may prompt interface 1200b, or similar, as shown in FIG. 12B. Interface 1200b identifies the insurance incentive being offered to the user (e.g., a 10% discount in this example). Various other incentives or types of incentives may be provided to the user without departing from the invention. For instance, discounts may be offered to avoid driving on particular road segments (e.g., road segments having a less safe rating).

If the user wishes to accept the offered incentive, he or she may select "ACCEPT" option. Alternatively, if the user does not wish to accept the offered incentive, he or she may select "NO, THANKS" option. Selection of "NO, THANKS" option may cause the incentive to be stored in the system for a pre-determined period of time (e.g., one week, one month, etc.) so that the user may return to the system and accept the incentive. However, in some arrangements, selection of "NO, THANKS" option may indicate that the user is not interested and, thus, no reminder notifications will be sent.

The systems, methods, and the like, described herein provide arrangements for determine a safety rating of a road segment that may be used to improve safe driving of a user, provide insurance incentives to the user, and the like. The use of road segments, rather than a "road" in general, may provide for additional granularity in the analysis. For instance, use of road segments may allow for the system to account for changes in the number of lanes, particular sections of a road that are in disrepair, sections of a road having more curves than other portions, changes in the municipality overseeing the road, and the like. Accordingly, a more accurate safety rating for road segments, roads, and entire routes may be provided to the user.

Further, the road segment safety rating system may be used to provide coaching aspects to one or more drivers. For instance, by making recommendations of safer road segments or routes, the system may aid drivers in identifying safe routes, etc. This aspect may be useful for various drivers and, for example, new drivers (e.g., teenagers).

Further, determination of suggested routes based on road segment safety ratings may be useful to non-insurance entities (in addition to insurance entities, such as entities that provide applications directed to navigation, identifying desirable neighborhoods, identifying roads in need of construction, designing new roadways, etc.

The arrangements described herein may also have commercial applicability in that trucks or vehicles of a certain size or weight may be prevented from travelling on certain road segments or routes. Accordingly, shipping costs may be varied based on the safety rating of one or more road segments traveled by the vehicle.

As discussed herein, the systems, arrangements, processed, etc. discussed herein may be used in various computing environments and/or with various computing devices. FIG. 13 illustrates a block diagram of a computing device (or system) 1301 in a computer system 1300 that may be used according to one or more illustrative embodiments of the disclosure. The device 1301 may have a processor 1303 for controlling overall operation of the device 1301 and its associated components, including RAM 1305, ROM 1307, input/output module 1309, and memory 1315. The computing device 1301, along with one or more additional devices (e.g., terminals 1341, 1351, and 1361, security and integration hardware 1360) may correspond to any of multiple systems or devices described herein, such as personal mobile devices, vehicle-based computing devices, insurance systems servers, external data sources and other various devices in a risk unit based insurance system. These various computing systems may be configured individually or in combination, as described herein, for determining and/or providing road segment safety ratings (e.g., based on historical accident and/or traffic information, driver specific behavior data, etc.), determining insurance rates associated with a particular road segment, generating recommendations for road segments with safer ratings, and the like, using the devices of the road segment safety rating systems described herein. In addition to the features described above, the techniques described herein also may be used for generating and presenting insurance recommendations to customers, insurance underwriting, and other insurance-related tasks.

Input/Output (I/O) 1309 may include a microphone, keypad, touch screen, and/or stylus through which a user of the computing device 1301 may provide input, and may also include one or more of a speaker for providing audio output and a video display device for providing textual, audiovisual and/or graphical output. Software may be stored within memory 1315 and/or storage to provide instructions to processor 1303 for enabling device 1301 to perform various actions. For example, memory 1315 may store software used by the device 1301, such as an operating system 1317, application programs 1319, and an associated internal database 1321. The various hardware memory units in memory 1315 may include volatile and nonvolatile, removable and non-removable media implemented in any method or technology for storage of information such as computer-readable instructions, data structures, program modules or other data. Certain devices and systems within the road segment safety rating systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 1301 (e.g., a personal mobile device 1301, vehicle-based device 1301, insurance system server 1301, etc.), in order to collect and analyze driver data, vehicle data, traffic data, and/or accident data, determine a safety rating for a road segment, determine an insurance rate or cost associated with the road segment, etc., using the various devices of the road segment safety rating systems. Memory 1315 also may include one or more physical persistent memory devices and/or one or more non-persistent memory devices. Memory 1315 may include, but is not limited to, random access memory (RAM) 1305, read only memory (ROM) 1307, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 1303.

Processor 1303 may include a single central processing unit (CPU), which may be a single-core or multi-core processor (e.g., dual-core, quad-core, etc.), or may include multiple CPUs. Processor(s) 1303 may have various bit sizes (e.g., 16-bit, 32-bit, 64-bit, 96-bit, 128-bit, etc.) and various processor speeds (ranging from 100 MHz to 5 Ghz or faster). Processor(s) 1303 and its associated components may allow the system 1301 to execute a series of computer-readable instructions, for example, to receive and analyze driver data, vehicle data, traffic data and/or accident data, determine a safety rating for a road segment, generate recommendations for alternate road segments having a safer rating, and the like.

The computing device (e.g., a personal mobile device, vehicle-based system, insurance system server, etc.) may operate in a networked environment 1300 supporting connections to one or more remote computers, such as terminals 1341, 1351, and 1361. Such terminals may be personal computers or servers 1341 (e.g., home computers, laptops, web servers, database servers), mobile communication devices 1351 (e.g., mobile phones, tablet computers, etc.), vehicle-based computing systems 1361 (e.g., on-board vehicle systems, telematics devices, mobile phones or other personal mobile devices within vehicles), and the like, each of which may include some or all of the elements described above with respect to the computing device 1301. The network connections depicted in FIG. 13 include a local area network (LAN) 1325 and a wide area network (WAN) 1329, and a wireless telecommunications network 1333, but may also include other networks. When used in a LAN networking environment, the computing device 1301 may be connected to the LAN 1325 through a network interface or adapter 1323. When used in a WAN networking environment, the device 1301 may include a modem 1327 or other means for establishing communications over the WAN 1329, such as network 1331 (e.g., the Internet). When used in a wireless telecommunications network 1333, the device 1301 may include one or more transceivers, digital signal processors, and additional circuitry and software for communicating with wireless computing devices 1351 and 1361 (e.g., mobile phones, portable customer computing devices, vehicle-based computing devices and systems, etc.) via one or more network devices 1335 (e.g., base transceiver stations) in the wireless network 1333.

Also illustrated in FIG. 13 is a security and integration layer 1360, through which communications are sent and managed between the device 1301 (e.g., a personal mobile device, a vehicle-based computing device, an insurance server, an intermediary server and/or external data source servers, etc.) and the remote devices (1341, 1351, and 1361) and remote networks (1325, 1329, and 1333). The security and integration layer 1360 may comprise one or more separate computing devices, such as web servers, authentication servers, and/or various networking components (e.g., firewalls, routers, gateways, load balancers, etc.), having some or all of the elements described above with respect to the computing device 1301. As an example, a security and integration layer 1360 of a server 1301 may comprise a set of web application servers configured to use secure protocols and to insulate the device 1301 from external devices 1341, 1351, and 1361. In some cases, the security and integration layer 1360 may correspond to a set of dedicated hardware and/or software operating at the same physical location and under the control of same entities as device 1301. For example, layer 1360 may correspond to one or more dedicated web servers and network hardware in a vehicle and driver information datacenter or in a cloud infrastructure supporting a cloud-based vehicle identification and vehicle and driver data retrieval and analysis. In other examples, the security and integration layer 1360 may correspond to separate hardware and software components which may be operated at a separate physical location and/or by a separate entity.

As discussed herein, the data transferred to and from various devices in a road segment safety rating system 1300 may include secure and sensitive data, such as confidential vehicle operation data, insurance policy data, and confidential user data from drivers and passengers in vehicles. Therefore, it may be desirable to protect transmissions of such data by using secure network protocols and encryption, and also to protect the integrity of the data when stored on the various devices within a road segment safety rating system, such as personal mobile devices, vehicle-based devices, insurance servers, external data source servers, or other computing devices in the system 1300, by using the security and integration layer 1360 to authenticate users and restrict access to unknown or unauthorized users. In various implementations, security and integration layer 1360 may provide, for example, a file-based integration scheme or a service-based integration scheme for transmitting data between the various devices in an electronic display system 1300. Data may be transmitted through the security and integration layer 1360, using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In other examples, one or more web services may be implemented within the various devices 1301 in the system 1300 and/or the security and integration layer 1360. The web services may be accessed by authorized external devices and users to support input, extraction, and manipulation of the data (e.g., vehicle data, driver data, driving trip data, etc.) between the various devices 1301 in the system 1300. Web services built to support a personalized display system may be cross-domain and/or cross-platform, and may be built for enterprise use. Such web services may be developed in accordance with various web service standards, such as the Web Service Interoperability (WS-I) guidelines. In some examples, a driver data, vehicle data, traffic data, and/or accident data analysis web service, road segment safety analysis web service, insurance rate analysis web service, etc. may be implemented in the security and integration layer 1360 using the Secure Sockets Layer (SSL) or Transport Layer Security (TLS) protocol to provide secure connections between servers 101 and various clients 1341, 1351, and 1361. SSL or TLS may use HTTP or HTTPS to provide authentication and confidentiality. In other examples, such web services may be implemented using the WS-Security standard, which provides for secure SOAP messages using XML encryption. In still other examples, the security and integration layer 1360 may include specialized hardware for providing secure web services. For example, secure network appliances in the security and integration layer 1360 may include built-in features such as hardware-accelerated SSL and HTTPS, WS-Security, and firewalls. Such specialized hardware may be installed and configured in the security and integration layer 1360 in front of the web servers, so that any external devices may communicate directly with the specialized hardware.

Although not shown in FIG. 13, various elements within memory 1315 or other components in system 1300, may include one or more caches, for example, CPU caches used by the processing unit 1303, page caches used by the operating system 1317, disk caches of a hard drive, and/or database caches used to cache content from database 1321. For embodiments including a CPU cache, the CPU cache may be used by one or more processors in the processing unit 1303 to reduce memory latency and access time. In such examples, a processor 1303 may retrieve data from or write data to the CPU cache rather than reading/writing to memory 1315, which may improve the speed of these operations. In some examples, a database cache may be created in which certain data from a database 1321 (e.g., a database of driver data, driving behaviors or characteristics, passenger-related data, vehicle data, traffic data, accident data, etc.) is cached in a separate smaller database on an application server separate from the database server (e.g., at a personal mobile device, vehicle-based data, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of risk unit based insurance systems, such as faster response times and less dependence on network conditions when transmitting and receiving driver information, vehicle information, traffic information, accident information, road segment safety rating information, and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in risk unit based insurance system components described herein may be configured to communicate using any of these network protocols or technologies.

Additionally, one or more application programs 1319 may be used by the various computing devices 1301 within a road segment safety rating system 1300 (e.g., vehicle data, driver data, traffic data, and/or accident data, analysis software applications, location determining software applications, etc.), including computer executable instructions for receiving and analyzing various driver data, vehicle data, traffic data and/or accident data, determining location of a vehicle, determine a safety rating for a road segment, and/or generating recommendations for alternate road segments having higher safety ratings using the devices of the road segment safety rating systems.

As discussed herein, determined road segment safety ratings may be determined and stored (e.g., in an on-board vehicle system, in a remote system, etc.). In some examples, at the completion of each trip, a determined road segment safety rating may be transmitted to an insurance provider and may be stored at an insurance provider system.

Further, although various examples discussed herein are directed to determining a road segment safety rating based on environmental or external factors, driver behavior, and the like, the data collected may further be used to identify hazards or risks along a route or projected route of a user. For instance, data associated with an accident that has recently occurred may be coupled with the driver's characteristic driving data to provide a warning to the user of the upcoming accident. That is, if the driver has a history of driving faster than the speed limit, or data indicated the driver is currently driving faster than the speed limit, and the accident identified is a short distance ahead, a warning or alert (e.g., displayed or audible) may be provided to the user indicating that an accident is ahead and the user should reduce speed. Various other arrangements in which external data is combined with driving behaviors to identify risk and alert drivers may be used without departing from the invention.

Although various implementations of the systems, methods, etc. described herein are provided above, below is one example of how the road segment safety rating system may be used. The example below is not intended to limit the arrangements discussed herein to only this implementation. Rather, the arrangements described herein may be implemented in various other ways without departing from the invention.

In one example, a driver may be provided with a plurality of routes to a particular destination upon identifying a destination (either by driver input or as predicted by the system). The plurality of routes provided may each have a different overall road safety rating (e.g., based on safety ratings of road segments comprising each route). The driver may then proceed to the identified destination via one of the plurality of routes, a combination of the identified routes, or via another route. Upon completion of the trip, an overall road segment safety rating for the route taken may be determined. This safety rating may then be transmitted to an insurance provider system for storage and use (as discussed herein).

In some examples, the overall safety rating of trips taken in a predetermined period of time (e.g., one month, three months, six months, etc.) may be evaluated (by the insurance provider system) and a discount or other incentive to provide to the driver may be generated based on this evaluation. The discount or incentive may then be applied to a next policy period.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A system comprising:
   a telematics device configured to receive sensor information corresponding to vehicle operation data associated with a vehicle, wherein the telematics device is communicatively coupled to an onboard diagnostic system of the vehicle and is further configured to identify at least one driving behavior of a driver of the vehicle based on the sensor information received over a duration of time;
   a global positioning system (GPS) device associated with the vehicle; and
   an insurance system server communicatively coupled to the GPS device and the telematics device, the insurance system server comprising at least one processor and at least one memory storing computer-readable instructions that, when executed by the at least one processor, cause the insurance system server to:

receive, from the GPS device associated with the vehicle, while the vehicle is traveling along a road segment, location information identifying a location of the vehicle;

determine, based on the location information received from the GPS device associated with the vehicle, the road segment on which the vehicle is travelling;

receive, from the telematics device, while the vehicle is traveling along the road segment, the sensor information received over the duration of time and an indication of the at least one driving behavior of the driver of the vehicle identified by the telematics device;

receive, from one or more sources, while the vehicle is traveling along the road segment, historical data associated with the road segment on which the vehicle is travelling;

while the vehicle is traveling along the road segment, determine a safety rating for the road segment on which the vehicle is travelling based on the historical data associated with the road segment on which the vehicle is travelling and the indication of the at least one driving behavior of the driver of the vehicle received from the telematics device;

while the vehicle is traveling along the road segment, determine an insurance cost associated with travelling on the road segment on which the vehicle is travelling based on the safety rating determined for the road segment on which the vehicle is travelling;

while the vehicle is traveling along the road segment, generate an insurance incentive based on the insurance cost associated with travelling on the road segment on which the vehicle is travelling; and while the vehicle is traveling along the road segment, provide the safety rating for the road segment on which the vehicle is travelling to the driver of the vehicle,
  wherein providing the safety rating for the road segment on which the vehicle is travelling to the driver of the vehicle comprises sending route risk value information to the GPS device associated with the vehicle based on the safety rating for the road segment on which the vehicle is travelling,
  wherein sending the route risk value information to the GPS device associated with the vehicle causes the GPS device associated with the vehicle to display the road segment on which the vehicle is travelling in a red color if the safety rating for the road segment on which the vehicle is travelling is below a predetermined threshold or in a green color if the safety rating for the road segment on which the vehicle is travelling is not below the predetermined threshold, and
  wherein providing the safety rating for the road segment on which the vehicle is travelling to the driver of the vehicle comprises sending, to the GPS device associated with the vehicle, the insurance incentive generated based on the insurance cost associated with travelling on the road segment on which the vehicle is travelling.

2. The system of claim 1, wherein the at least one memory stores additional computer-readable instructions that, when executed by the at least one processor, cause the insurance system server to:

determine whether the safety rating for the road segment on which the vehicle is travelling is above a second predetermined threshold;

responsive to determining that the safety rating for the road segment on which the vehicle is travelling is not above the second predetermined threshold, generate information suggesting at least one alternate road segment for the vehicle and transmit, to a device associated with the driver of the vehicle, the information suggesting the at least one alternate road segment for the vehicle; and responsive to determining that the safety rating for the road segment on which the vehicle is travelling is above the second predetermined threshold, transmit, to the device associated with the driver of the vehicle, information indicating that the safety rating of the road segment on which the vehicle is travelling is above the second predetermined threshold.

3. The system of claim 1, wherein the historical data associated with the road segment on which the vehicle is travelling comprises one or more of accident frequency data associated with the road segment on which the vehicle is travelling or traffic volume data associated with the road segment on which the vehicle is travelling.

4. The system of claim 1, wherein the at least one memory stores additional computer-readable instructions that, when executed by the at least one processor, cause the insurance system server to:

identify the driver of the vehicle; and based on identifying the driver of the vehicle, retrieve driving behavior information associated with the driver of the vehicle, wherein determining the safety rating for the road segment on which the vehicle is travelling is based on the driving behavior information associated with the driver of the vehicle.

5. The system of claim 1, wherein providing the safety rating for the road segment on which the vehicle is travelling to the driver of the vehicle comprises transmitting a notification to a computing device of the driver of the vehicle, the notification comprising the safety rating determined for the road segment on which the vehicle is travelling.

6. The system of claim 5, wherein transmitting the notification to the computing device of the driver of the vehicle comprises transmitting the notification to a mobile device associated with the driver of the vehicle.

7. The system of claim 1, wherein generating the insurance incentive based on the insurance cost associated with travelling on the road segment on which the vehicle is travelling comprises generating a first insurance incentive corresponding to a discount on a premium based on the safety rating determined for the road segment on which the vehicle is travelling.

8. The system of claim 1, wherein generating the insurance incentive based on the insurance cost associated with travelling on the road segment on which the vehicle is travelling comprises generating a second insurance incentive corresponding to an amount of cash reward based on the safety rating determined for the road segment on which the vehicle is travelling.

9. A method comprising:

at an insurance system server comprising at least one processor and at least one memory:

receiving, by the at least one processor of the insurance system server, from a global positioning system (GPS) device associated with a vehicle, while the vehicle is traveling along a road segment, location information identifying a location of the vehicle, wherein the insurance system server is communicatively coupled to the GPS device and a telematics device configured to receive sensor information corresponding to vehicle operation data associated with a vehicle;

determining, by the at least one processor of the insurance system server, based on the location information received from the GPS device associated with the vehicle, the road segment on which the vehicle is travelling;

receiving, by the at least one processor of the insurance system server, from the telematics device, while the vehicle is traveling along the road segment, sensor information received over a duration of time and an indication of at least one driving behavior of a driver of the vehicle identified by the telematics device, wherein the telematics device is communicatively coupled to an onboard diagnostic system of the vehicle and is further configured to identify the at least one driving behavior of the driver of the vehicle based on the sensor information received over the duration of time;

receiving, by the at least one processor of the insurance system server, from one or more sources, while the vehicle is traveling along the road segment, historical data associated with the road segment on which the vehicle is travelling;

while the vehicle is traveling along the road segment, determining, by the at least one processor of the insurance system server, a safety rating for the road segment on which the vehicle is travelling based on the historical data associated with the road segment on which the vehicle is travelling and the indication of the at least one driving behavior of the driver of the vehicle received from the telematics device;

while the vehicle is traveling along the road segment, determining, by the at least one processor of the insurance system server, an insurance cost associated with travelling on the road segment on which the vehicle is travelling based on the safety rating determined for the road segment on which the vehicle is travelling;

while the vehicle is traveling along the road segment, generating, by the at least one processor of the insurance system server, an insurance incentive based on the insurance cost associated with travelling on the road segment on which the vehicle is travelling; and while the vehicle is traveling along the road segment, providing, by the at least one processor of the insurance system server, the safety rating for the road segment on which the vehicle is travelling to the driver of the vehicle, wherein providing the safety rating for the road segment on which the vehicle is travelling to the driver of the vehicle comprises sending route risk value information to the GPS device associated with the vehicle based on the safety rating for the road segment on which the vehicle is travelling, wherein sending the route risk value information to the GPS device associated with the vehicle causes the GPS device associated with the vehicle to display the road segment on which the vehicle is travelling in a red color if the safety rating for the road segment on which the vehicle is travelling is below a predetermined threshold or in a green color if the safety rating for the road segment on which the vehicle is travelling is not below the predetermined threshold, and wherein providing the safety rating for the road segment on which the vehicle is travelling to the driver of the vehicle comprises sending, to the GPS device associated with the vehicle, the insurance incentive generated based on the insurance cost associated with travelling on the road segment on which the vehicle is travelling.

10. The method of claim 9, comprising:

determining, by the at least one processor of the insurance system server, whether the safety rating for the road segment on which the vehicle is travelling is above a second predetermined threshold;

responsive to determining that the safety rating for the road segment on which the vehicle is travelling is not above the second predetermined threshold, generating, by the at least one processor of the insurance system server, information suggesting at least one alternate road segment for the vehicle and transmitting, by the at least one processor of the insurance system server, to a device associated with the driver of the vehicle, the information suggesting the at least one alternate road segment for the vehicle; and responsive to determining that the safety rating for the road segment on which the vehicle is travelling is above the second predetermined threshold, transmitting, by the at least one processor of the insurance system server, to the device associated with the driver of the vehicle, information indicating that the safety rating of the road segment on which the vehicle is travelling is above the second predetermined threshold.

11. The method of claim 9, wherein the historical data associated with the road segment on which the vehicle is travelling comprises one or more of accident frequency data associated with the road segment on which the vehicle is travelling or traffic volume data associated with the road segment on which the vehicle is travelling.

12. The method of claim 9, comprising:

identifying, by the at least one processor of the insurance system server, the driver of the vehicle; and based on identifying the driver of the vehicle, retrieving, by the at least one processor of the insurance system server, driving behavior information associated with the driver of the vehicle, wherein determining the safety rating for the road segment on which the vehicle is travelling is based on the driving behavior information associated with the driver of the vehicle.

13. The method of claim 9, wherein providing the safety rating for the road segment on which the vehicle is travelling to the driver of the vehicle comprises transmitting a notification to a computing device of the driver of the vehicle, the notification comprising the safety rating determined for the road segment on which the vehicle is travelling.

14. The method of claim 13, wherein transmitting the notification to the computing device of the driver of the vehicle comprises transmitting the notification to a mobile device associated with the driver of the vehicle.

15. The method of claim 9, wherein generating the insurance incentive based on the insurance cost associated with travelling on the road segment on which the vehicle is travelling comprises generating a first insurance incentive corresponding to a discount on a premium based on the safety rating determined for the road segment on which the vehicle is travelling.

16. One or more non-transitory computer-readable media storing instructions that, when executed by an insurance system server comprising at least one processor and at least one memory, cause the insurance system server to:

receive, from a global positioning system (GPS) device associated with a vehicle, while the vehicle is traveling along a road segment, location information identifying a location of the vehicle, wherein the insurance system server is communicatively coupled to the GPS device and a telematics device configured to receive sensor information corresponding to vehicle operation data associated with a vehicle;

determine, based on the location information received from the GPS device associated with the vehicle, the road segment on which the vehicle is travelling;

receive, from the telematics device, while the vehicle is traveling along the road segment, sensor information received over a duration of time and an indication of at least one driving behavior of a driver of the vehicle identified by the telematics device, wherein the telematics device is communicatively coupled to an onboard diagnostic system of the vehicle and is further configured to identify the at least one driving behavior of the driver of the vehicle based on the sensor information received over the duration of time;

receive, from one or more sources, while the vehicle is traveling along the road segment, historical data associated with the road segment on which the vehicle is travelling;

while the vehicle is traveling along the road segment, determine a safety rating for the road segment on which the vehicle is travelling based on the historical data associated with the road segment on which the vehicle is travelling and the indication of the at least one driving behavior of the driver of the vehicle received from the telematics device;

while the vehicle is traveling along the road segment, determine an insurance cost associated with travelling on the road segment on which the vehicle is travelling based on the safety rating determined for the road segment on which the vehicle is travelling;

while the vehicle is traveling along the road segment, generate an insurance incentive based on the insurance cost associated with travelling on the road segment on which the vehicle is travelling; and while the vehicle is traveling along the road segment, provide the safety rating for the road segment on which the vehicle is travelling to the driver of the vehicle, wherein providing the safety rating for the road segment on which the vehicle is travelling to the driver of the vehicle comprises sending route risk value information to the GPS device associated with the vehicle based on the safety rating for the road segment on which the vehicle is travelling, wherein sending the route risk value information to the GPS device associated with the vehicle causes the GPS device associated with the vehicle to display the road segment on which the vehicle is travelling in a red color if the safety rating for the road segment on which the vehicle is travelling is below a predetermined threshold or in a green color if the safety rating for the road segment on which the vehicle is travelling is not below the predetermined threshold, and wherein providing the safety rating for the road segment on which the vehicle is travelling to the driver of the vehicle comprises sending, to the GPS device associated with the vehicle, the insurance incentive generated based on the insurance cost associated with travelling on the road segment on which the vehicle is travelling.

17. The one or more non-transitory computer-readable media of claim 16, storing additional instructions that, when executed by the insurance system server, cause the insurance system server to:

determine whether the safety rating for the road segment on which the vehicle is travelling is above a second predetermined threshold;

responsive to determining that the safety rating for the road segment on which the vehicle is travelling is not above the second predetermined threshold, generate information suggesting at least one alternate road segment for the vehicle and transmit to a device associated with the driver of the vehicle, the information suggesting the at least one alternate road segment for the vehicle; and responsive to determining that the safety rating for the road segment on which the vehicle is travelling is above the second predetermined threshold, transmit to the device associated with the driver of the vehicle, information indicating that the safety rating of the road segment on which the vehicle is travelling is above the second predetermined threshold.

18. The one or more non-transitory computer-readable media of claim 16, wherein the historical data associated with the road segment on which the vehicle is travelling comprises one or more of accident frequency data associated with the road segment on which the vehicle is travelling or traffic volume data associated with the road segment on which the vehicle is travelling.

19. The one or more non-transitory computer-readable media of claim 16, storing additional instructions that, when executed by the insurance system server, cause the insurance system server to:

identify the driver of the vehicle; and based on identifying the driver of the vehicle, retrieve driving behavior information associated with the driver of the vehicle, wherein determining the safety rating for the road segment on which the vehicle is travelling is based on the driving behavior information associated with the driver of the vehicle.

20. The one or more non-transitory computer-readable media of claim 16, wherein providing the safety rating for the road segment on which the vehicle is travelling to the driver of the vehicle comprises transmitting a notification to a computing device of the driver of the vehicle, the notification comprising the safety rating determined for the road segment on which the vehicle is travelling.

* * * * *